(12) United States Patent
Higurashi et al.

(10) Patent No.: US 6,262,771 B1
(45) Date of Patent: Jul. 17, 2001

(54) METHOD AND APPARATUS FOR CONVERTING PICTURE SIGNAL, AND RECORDING AND REPRODUCING APPARATUS

(75) Inventors: Seiji Higurashi, Tokyo; Takayuki Sugahara, Yokosuka, both of (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/511,784

(22) Filed: Feb. 23, 2000

(30) Foreign Application Priority Data

Mar. 4, 1999 (JP) ................................. 11-056560
Mar. 17, 1999 (JP) ................................. 11-071889

(51) Int. Cl.$^7$ ...................................... H04N 7/01
(52) U.S. Cl. ................. 348/441; 348/450; 348/428.1
(58) Field of Search .................. 348/450, 453, 348/428.1, 391, 392, 441

(56) References Cited

U.S. PATENT DOCUMENTS

| | | | |
|---|---|---|---|
| 4,766,494 | * 8/1988 | Doyle | 358/140 |
| 5,650,824 | * 7/1997 | Huang | 348/453 |
| 5,982,432 | * 11/1999 | Uenoyama et al. | 348/453 |
| 6,088,062 | * 7/2000 | Kanou et al. | 348/453 |
| 6,134,374 | * 10/2000 | Harumatsu et al. | 386/33 |

FOREIGN PATENT DOCUMENTS 8-46519   2/1996 (JP) .

* cited by examiner

*Primary Examiner*—Reinhard J. Eisenzopf
*Assistant Examiner*—Brian P. Yenke
(74) *Attorney, Agent, or Firm*—Louis Woo

(57) ABSTRACT

A picture signal includes a luminance signal and a color signal. A first predetermined number of sample points of the luminance signal are located on every actual scanning line. A second predetermined number of sample points of the color signal are located on every actual scanning line. The second predetermined number is equal to the first predetermined number multiplied by "1/n", where "n" denotes a predetermined integer equal to or greater than 2. Virtual scanning lines are set which correspond to respective pairs each having two successive actual scanning lines. Sample points of the color signal are moved from each pair of two successive actual scanning lines to a corresponding virtual scanning line while being rearranged thereon so that the picture signal is converted. The total number of sample points of the color signal per virtual scanning line is equal to the first predetermined number multiplied by "2/n". A portion of the color signal whose sample points are located on a virtual scanning line corresponds to a portion of the luminance signal which relates to the corresponding pair of two successive actual scanning lines.

13 Claims, 17 Drawing Sheets

FIG. 14

| SYNTAX | BIT NUMBER |
|---|---|
| Picture () { | |
|     picture_start_code | 32 |
|     Temporal_reference | 10 |
|     picture_coding_type | 3 |
|     vbv_delay | 16 |
|     if ((picture_coding_type==2) \|\| (picture_coding_type==3)) { | |
|         full_pel_forward_vector | 1 |
|         forward_f_code | 3 |
|     } | |
|     if ((picture_coding_type==3) { | |
|         full_pel_backward_vector | 1 |
|         backward_f_code | 3 |
|     } | |
|     while (nextbits () =='1') { | |
|         exstra_bit_picture | 1 |
|         exstra_information_picture | 8 |
|     } | |
|     extra_bit_picture | 1 |
|     next_start_code () | |
|     if (nextbits () ==extension_start_code) { | |
|         extention_start_code | 32 |
|         while (nextbits () ! ='0000 0000 0000 0000 0000 0001') { | |
|             Picture_extention_data | 8 |
|         } | |
|         Next_start_code () | |
|     } | |
|     if (nextbits () ==user_data_start_code) { | |
|         user_data_start_code | 32 |
|         while (nextbits () ! ='0000 0000 0000 0000 0000 0001') { | |
|             user_data | 8 |
|         } | |
|         Next_start_code () | |
|     } | |
|     do { | |
|         Slice () | |
|     } while (nextbits () ==slice_start_code) | |
| } | |

FIG. 15

| SYNTAX | BIT NUMBER |
|---|---|
| adaptation_field () { | |
|     adaptation_field_length | 8 |
|     if (adaptation_field_length>0) | |
|         discontinuity_indicator | 1 |
|         random_access_indicator | 1 |
|         elementary_stream_priority_indicator | 1 |
|         PCR_flag | 1 |
|         OPCR_flag | 1 |
|         splicing_point_flag | 1 |
|         transport_private_data_flag | 1 |
|         adaptation_field_extension_flag | 1 |
|         if (PCR_flag=='1') { | |
|             program_clock_reference_base | 33 |
|             reserved | 6 |
|             program_clock_reference_extension | 9 |
|         } | |
|         if (OPCR_flag=='1') { | |
|             original_program_clock_reference_base | 33 |
|             reserved | 6 |
|             original_program_clock_reference_extension | 9 |
|         } | |
|         if (splicing_point_flag=='1') { | |
|             splice_countdown | 8 |
|         } | |
|         if (transport_private_data_flag=='1') { | |
|             transport_private_data_length | 8 |
|             for (i=0 ; i<transport_private_data_length ; i++) { | |
|                 private_data_byte | 8 |
|             } | |
|         } | |
|         if (adaptation_field_extension_flag=='1') { | |
|             adaptation_field_extension_length | 8 |
|             ltw_flag | 1 |
|             piecewise_rate_flag | 1 |
|             seamless_splice_flag | 1 |
|             reserved | 5 |
|             if (ltw_flag=='1') { | |
|                 ltw_valid_flag | 1 |
|                 ltw_offset | 15 |
|             } | |
|             if (piecewise_rate_flag=='1') { | |
|                 reserved | 2 |
|                 piecewise_rate | 22 |
|             } | |
|             if (seamless_splice_flag=='1') { | |
|                 splice_type | 4 |
|                 DTS_nexst_AU [32..30] | 3 |
|                 marker_bit | 1 |
|                 DTS_nexst_AU [29..15] | 15 |
|                 marker_bit | 1 |
|                 DTS_nexst_AU [14..0] | 15 |
|                 marker_bit | 1 |
|             } | |
|             for (i=0 ; i<N ; i++) { | |
|                 reserved | 8 |
|             } | |
|         } | |
|         for (i=0 ; i<N ; i++) { | |
|             stuffing_byte | 8 |
|         } | |
|     } | |
| } | |

METHOD AND APPARATUS FOR CONVERTING PICTURE SIGNAL, AND RECORDING AND REPRODUCING APPARATUS

BACKGROUND OF THE INVENTION

1. Field of the Invention

This invention relates to a method of converting a picture signal, an apparatus for converting a picture signal, and an apparatus for recording and reproducing a picture signal. In addition, this invention relates to a method of encoding a picture signal, a method of decoding a picture signal, an apparatus for encoding a picture signal, and an apparatus for decoding a picture signal.

2. Description of the Related Art

Some digital VTR's (video tape recorders) handle digital component video signals (digital Y, Cr, and Cb signals) which are derived from analog component video signals (analog Y, Cr, and Cb signals) through an analog-to-digital conversion process. Here, the Y signals mean luminance signals. In addition, the Cr signals mean R-Y signals (first color difference signals) while the Cb signals mean B-Y signals (second color difference signals). Specifically, during the analog-to-digital conversion process, the analog Y, Cr, and Cb signals are sampled at given sampling frequencies respectively, and then the samples of the analog Y, Cr, and Cb signals are digitized.

There are the DV standards (the DVC standards) for home-use digital VTR's. Here, "DV" is short for digital video, and "DVC" is short for a digital video cassette. According to the DV standards, the ratio among the sampling frequencies for the respective analog Y, Cr, and Cb signals is "4:1:1".

Digital picture signals for DVD's (digital versatile discs) and CS digital broadcasting conform to the MPEG2 (Moving Picture Experts Group 2) standards. According to the MPEG2 standards, the ratio among the sampling frequencies for respective analog Y, Cr, and Cb signals is "4:2:0 (4:0:2)". In an example of the 4:2:0 signal format, horizontal scanning lines related to a sampling frequency ratio of "4:2:0" alternate with horizontal scanning lines related to a sampling frequency ratio of "4:0:2". Such a signal format is denoted by "4:2:0" for convenience.

Any simple methods and apparatuses for converting 4:1:1 picture signals into 4:2:0 picture signals are unknown. In addition, any simple methods and apparatuses for converting 4:2:0 picture signals into 4:1:1 picture signals are unknown. Japanese published unexamined patent application 8-46519 discloses a specification conversion circuit which operates to convert a 4:2:2 picture signal into a 4:2:0 picture signal.

SUMMARY OF THE INVENTION

It is a first object of this invention to provide a method of converting a 4:1:1 picture signal into a 4:2:0 picture signal.

It is a second object of this invention to provide a method of converting a 4:2:0 picture signal into a 4:1:1 picture signal.

It is a third object of this invention to provide an apparatus for converting a 4:1:1 picture signal into a 4:2:0 picture signal.

It is a fourth object of this invention to provide an apparatus for converting a 4:2:0 picture signal into a 4:1:1 picture signal.

It is a fifth object of this invention to provide a picture-signal recording and reproducing apparatus in which conversion between a 4:1:1 picture signal and a 4:2:0 picture signal is implemented.

It is a sixth object of this invention to provide a method of encoding or decoding a 4:1:1 picture signal into a 4:2:0 picture signal.

It is a seventh object of this invention to provide a method of encoding or decoding a 4:2:0 picture signal into a 4:1:1 picture signal.

It is an eighth object of this invention to provide an apparatus for encoding or decoding a 4:1:1 picture signal into a 4:2:0 picture signal.

It is a ninth object of this invention to provide an apparatus for encoding or decoding a 4:2:0 picture signal into a 4:1:1 picture signal.

A first aspect of this invention provides a method of converting a picture signal including a luminance signal and a color signal, wherein a first predetermined number of sample points of the luminance signal are located on every actual scanning line, and a second predetermined number of sample points of the color signal are located on every actual scanning line, and wherein the second predetermined number is equal to the first predetermined number multiplied by "1/n", where "n" denotes a predetermined integer equal to or greater than 2. The method comprises the steps of setting virtual scanning lines which correspond to respective pairs each having two successive actual scanning lines; and moving sample points of the color signal from each pair of two successive actual scanning lines to a corresponding virtual scanning line while rearranging the sample points on the corresponding virtual scanning line to convert the picture signal; wherein a total number of sample points of the color signal per virtual scanning line is equal to the first predetermined number multiplied by "2/n", and a portion of the color signal whose sample points are located on a virtual scanning line corresponds to a portion of the luminance signal which relates to the corresponding pair of two successive actual scanning lines.

A second aspect of this invention is based on the first aspect thereof, and provides a method wherein the moving and rearranging step comprises making nearest before-conversion sample points into neighboring after-conversion sample points on a virtual scanning line.

A third aspect of this invention provides a method of converting a picture signal including a luminance signal and a color signal, wherein virtual scanning lines are set for respective pairs each having two successive actual scanning lines, wherein a first predetermined number of sample points of the luminance signal are located on every actual scanning line, and a second predetermined number of sample points of the color signal are located on every virtual scanning line, wherein the second predetermined number is equal to the first predetermined number multiplied by "2/n", where "n" denotes a predetermined integer equal to or greater than 2. The method comprises the steps of separating sample points of the color signal on every virtual scanning line into first and second groups assigned to respective two successive actual scanning lines in a corresponding pair respectively; and moving the sample points in the first group to first one of the two successive actual scanning lines while moving the sample points in the second group to second one of the two successive actual scanning lines to convert the picture signal; wherein a total number of the sample points of the color signal per actual scanning line is equal to the first predetermined number multiplied by "1/n", and a portion of the color signal whose sample points are located on an actual scanning line corresponds to a portion of the luminance signal which relates to the same actual scanning line.

A fourth aspect of this invention provides an apparatus for converting a picture signal including a luminance signal and a color signal, wherein a first predetermined number of sample points of the luminance signal are located on every actual scanning line, and a second predetermined number of sample points of the color signal are located on every actual scanning line, and wherein the second predetermined number is equal to the first predetermined number multiplied by "1/n", where "n" denotes a predetermined integer equal to or greater than 2. The apparatus comprises means for setting virtual scanning lines which correspond to respective pairs each having two successive actual scanning lines; and means for moving sample points of the color signal from each pair of two successive actual scanning lines to a corresponding virtual scanning line while rearranging the sample points on the corresponding virtual scanning line to convert the picture signal; wherein a total number of sample points of the color signal per virtual scanning line is equal to the first predetermined number multiplied by "2/n", and a portion of the color signal whose sample points are located on a virtual scanning line corresponds to a portion of the luminance signal which relates to the corresponding pair of two successive actual scanning lines.

A fifth aspect of this invention is based on the fourth aspect thereof, and provides an apparatus wherein the moving and rearranging means comprises means for making nearest before-conversion sample points into neighboring after-conversion sample points on a virtual scanning line.

A sixth aspect of this invention provides an apparatus for converting a picture signal including a luminance signal and a color signal, wherein virtual scanning lines are set for respective pairs each having two successive actual scanning lines, wherein a first predetermined number of sample points of the luminance signal are located on every actual scanning line, and a second predetermined number of sample points of the color signal are located on every virtual scanning line, wherein the second predetermined number is equal to the first predetermined number multiplied by "2/n", where "n" denotes a predetermined integer equal to or greater than 2. The apparatus comprises means for separating sample points of the color signal on every virtual scanning line into first and second groups assigned to respective two successive actual scanning lines in a corresponding pair respectively; and means for moving the sample points in the first group to first one of the two successive actual scanning lines while moving the sample points in the second group to second one of the two successive actual scanning lines to convert the picture signal; wherein a total number of the sample points of the color signal per actual scanning line is equal to the first predetermined number multiplied by "1/n", and a portion of the color signal whose sample points are located on an actual scanning line corresponds to a portion of the luminance signal which relates to the same actual scanning line.

A seventh aspect of this invention provides a picture-signal recording and reproducing apparatus comprising first means for converting a first picture signal into a second picture signal, the first picture signal including a first luminance signal and a first color signal, wherein a first predetermined number of sample points of the first luminance signal are located on every actual scanning line, and a second predetermined number of sample points of the first color signal are located on every actual scanning line, and wherein the second predetermined number is equal to the first predetermined number multiplied by "1/n", where "n" denotes a predetermined integer equal to or greater than 2; second means provided in the first means for setting virtual scanning lines which correspond to respective pairs each having two successive actual scanning lines; third means provided in the first means for moving sample points of the first color signal from each pair of two successive actual scanning lines to a corresponding virtual scanning line while rearranging the sample points on the corresponding virtual scanning line to convert the first picture signal to the second picture signal; wherein a total number of sample points of the first color signal per virtual scanning line is equal to the first predetermined number multiplied by "2/n", and a portion of the first color signal whose sample points are located on a virtual scanning line corresponds to a portion of the first luminance signal which relates to the corresponding pair of two successive actual scanning lines; fourth means for compressing the second picture signal into a third picture signal; fifth means for recording the third picture signal on a recording medium; sixth means for reproducing a fourth picture signal from the recording medium; seventh means for expanding the fourth picture signal into a fifth picture signal including a second luminance signal and a second color signal, wherein a third predetermined number of sample points of the second luminance signal are located on every actual scanning line, and a fourth predetermined number of sample points of the second color signal are located on every virtual scanning line, wherein the fourth predetermined number is equal to the third predetermined number multiplied by "2/n"; eighth means for converting the fifth picture signal into a sixth picture signal; ninth means provided in the eighth means for separating sample points of the second color signal on every virtual scanning line into first and second groups assigned to respective two successive actual scanning lines in a corresponding pair respectively; and tenth means provided in the eighth means for moving the sample points in the first group to first one of the two successive actual scanning lines while moving the sample points in the second group to second one of the two successive actual scanning lines to convert the fifth picture signal into the sixth picture signal; wherein a total number of the sample points of the second color signal per actual scanning line is equal to the third predetermined number multiplied by "1/n", and a portion of the second color signal whose sample points are located on an actual scanning line corresponds to a portion of the second luminance signal which relates to the same actual scanning line.

An eighth aspect of this invention provides a method of encoding a picture signal. The method comprises the steps of displacing pixel positions of a color difference signal in an input picture signal of a first component format to pixel positions equivalent to pixel positions of a color difference signal in a picture signal of a second component format different from the first component format to convert the input picture signal into a conversion-resultant picture signal; and compressively encoding the conversion-resultant picture signal in accordance with an encoding process corresponding to the second component format.

A ninth aspect of this invention is based on the eighth aspect thereof, and provides a method wherein the first component format is a 4:1:1 component format; the second component format is a 4:2:0 component format; and the compressively encoding conforms to an MPEG standard.

A tenth aspect of this invention is based on the eighth aspect thereof, and provides a method wherein the first component format is a 4:2:0 component format; the second component format is a 4:1:1 component format; and the compressively encoding conforms to a DVC standard.

An eleventh aspect of this invention provides a method of decoding a picture signal generated by an encoding apparatus which comprises means for displacing pixel positions of a color difference signal in an input picture signal of a first component format to pixel positions equivalent to pixel positions of a color difference signal in a picture signal of a second component format different from the first component format to convert the input picture signal into a conversion-resultant picture signal; and means for compressively encoding the conversion-resultant picture signal into an encoding-resultant picture signal in accordance with an encoding process corresponding to the second component format. The method comprises the steps of expansively decoding the encoding-resultant picture signal into a decoding-resultant picture signal; and displacing pixel positions of a color difference signal in the decoding-resultant picture signal to pixel positions equivalent to pixel positions of a color difference signal in a picture signal of the first component format to convert the decoding-resultant picture signal.

A twelfth aspect of this invention provides an apparatus for encoding a picture signal. The apparatus comprises first means for displacing pixel positions of a color difference signal in an input picture signal of a first component format to pixel positions equivalent to pixel positions of a color difference signal in a picture signal of a second component format different from the first component format to convert the input picture signal into a conversion-resultant picture signal; second means for generating an ID code signal representing that the first means has executed the displacing; third means for compressively encoding the conversion-resultant picture signal into an encoding-resultant picture signal in accordance with an encoding process corresponding to the second component format; and fourth means for multiplexing the ID code signal with the encoding-resultant picture signal.

A thirteenth aspect of this invention provides an apparatus for decoding a picture signal generated by an encoding apparatus which comprises means for displacing pixel positions of a color difference signal in an input picture signal of a first component format to pixel positions equivalent to pixel positions of a color difference signal in a picture signal of a second component format different from the first component format to convert the input picture signal into a conversion-resultant picture signal; and means for compressively encoding the conversion-resultant picture signal into an encoding-resultant picture signal in accordance with an encoding process corresponding to the second component format. The decoding apparatus comprises means for expansively decoding the encoding-resultant picture signal into a decoding-resultant picture signal; and means for displacing pixel positions of a color difference signal in the decoding-resultant picture signal to pixel positions equivalent to pixel positions of a color difference signal in a picture signal of the first component format to convert the decoding-resultant picture signal.

BRIEF DESCRIPTION OF THE DRAWINGS

FIG. 14 is a table of a portion of an MPEG1 video stream picture layer.

FIG. 15 is a table of a portion of a system layer in an MPEG2 transport stream.

DESCRIPTION OF THE PREFERRED EMBODIMENTS

First Embodiment

Figure 1:
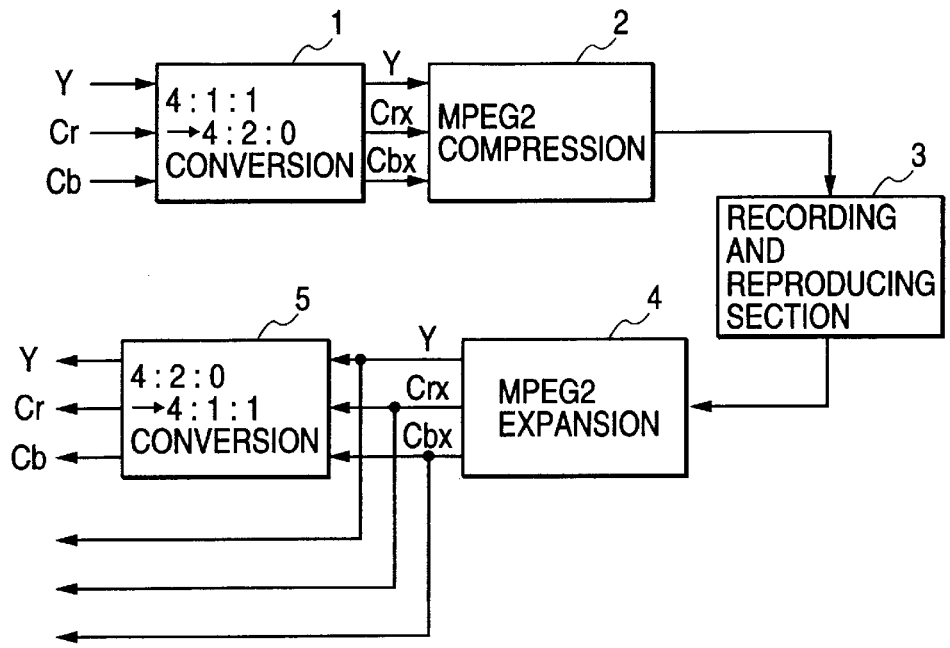
FIG. 1 is a block diagram of a portion of a recording and reproducing apparatus according to a first embodiment of this invention.

According to a first embodiment of this invention, a first digital picture signal is converted into a second digital picture signal.

The first digital picture signal includes a first digital luminance signal and a first digital color signal. A first predetermined number of sample points of the first digital luminance signal are located on every actual scanning line. A second predetermined number of sample points of the first digital color signal are located on every actual scanning line. The second predetermined number is equal to the first predetermined number multiplied by "1/n", where "n" denotes a predetermined integer equal to or greater than 2. Preferably, the predetermined integer "n" is equal to 2 or 4.

In every frame or field, a virtual scanning line is set for each pair of two successive actual scanning lines. During the conversion of the first digital picture signal into the second digital picture signal, sample points of the first digital color signal are moved from the pair of two successive actual scanning lines to the virtual scanning line while being rearranged thereon. The total number of the sample points of the first digital color signal on the virtual scanning line is equal to the first predetermined number multiplied by "2/n". A portion of the first digital color signal whose sample points are located on the virtual scanning line corresponds to a portion of the first digital luminance signal which relates to the pair of two successive actual scanning lines.

According to the first embodiment of this invention, a third digital picture signal is converted into a fourth digital picture signal. The format of the third digital picture signal is the same as that of the second digital picture signal. The format of the fourth digital picture signal is the same as that of the first digital picture signal.

The third digital picture signal includes a second digital luminance signal and a second digital color signal. A third predetermined number of sample points of the second digital luminance signal are located on every actual scanning line. In every frame or field, a virtual scanning line is set for each pair of two successive actual scanning lines. A fourth predetermined number of sample points of the second digital color signal are located on every virtual scanning line. The fourth predetermined number is equal to the third predetermined number multiplied by "2/n", where "n" denotes the predetermined integer equal to or greater than 2. Preferably, the predetermined integer "n" is equal to 2 or 4.

During the conversion of the third digital picture signal into the fourth digital picture signal, sample points of the second digital color signal on every virtual scanning line are separated into first and second groups assigned to the corresponding two successive actual scanning lines respectively. Thus, the sample points of the second digital color signal in the first group are made into correspondence with first one of the two successive actual scanning lines, while the sample points of the second digital color signal in the second group are made into correspondence with second one of the two successive actual scanning lines. The sample points in the first group are moved to first one of the two successive actual scanning lines while the sample points in the second group are moved to second one of the two successive actual scanning lines. The total number of the sample points of the second digital color signal per actual scanning line is equal to the third predetermined number multiplied by "1/n". A portion of the second digital color signal whose sample points are located on an actual scanning line corresponds to a portion of the second digital luminance signal which relates to the same actual scanning line.

FIG. 1 shows a portion of an apparatus for recording and reproducing digital picture signals according to the first embodiment of this invention. The recording and reproducing apparatus of FIG. 1 is designed to handle digital picture signals in which the previously-indicated predetermined integer "n" is set to 4.

As shown in FIG. 1, the recording and reproducing apparatus includes a 4:1:1/4:2:0 converting section 1, an MPEG2 compressing section 2, a recording and reproducing section 3, an MPEG2 expanding section 4, and a 4:2:0/4:1:1 converting section 5. Here, "MPEG2" is short for "Moving Picture Experts Group 2".

The 4:1:1/4:2:0 converting section 1 is followed by the MPEG2 compressing section 2. The MPEG2 compressing section 2 is connected to the recording and reproducing section 3. The recording and reproducing section 3 is connected to the MPEG2 expanding section 4. The MPEG2 expanding section 4 is followed by the 4:2:0/4:1:1 converting section 5.

During a recording mode of operation of the apparatus, a 4:1:1 digital picture signal is inputted into the 4:1:1/4:2:0 converting section 1. The input 4:1:1 digital picture signal is composed of digital component video signals (digital Y, Cr, and Cb signals). Here, the Y signal means a luminance signal. In addition, the Cr signal means an R-Y signal (a first color difference signal) while the Cb signal means a B-Y signal (a second color difference signal). For example, the digital component video signals are generated as follows. The digital component video signals are derived from analog component video signals (analog Y, Cr, and Cb signals) through an analog-to-digital conversion process. Specifically, during the analog-to-digital conversion process, the analog Y, Cr, and Cb signals are sampled at given sampling frequencies respectively, and then the samples of the analog Y, Cr, and Cb signals are digitized. The ratio among the sampling frequencies for the respective analog Y, Cr, and Cb signals is "4:1:1".

During the recording mode of operation of the apparatus, the 4:1:1/4:2:0 converting section 1 converts the input 4:1:1 digital picture signal into a 4:2:0 digital picture signal. The 4:1:1/4:2:0 converting section 1 outputs the 4:2:0 digital picture signal to the MPEG2 compressing section 2. The MPEG2 compressing section 2 encodes and compresses the 4:2:0 digital picture signal into a compression-resultant digital picture signal according to a compressively encoding process based on the MPEG2 standards. The MPEG2 compressing section 2 outputs the compression-resultant digital picture signal to the recording and reproducing section 3. The recording and reproducing section 3 records the output signal of the MPEG2 compressing section 2 on a recording medium such as a magnetic disc, a magnetic tape, or an optical disc.

During a playback mode of operation of the apparatus, the recording and reproducing section 3 reproduces a digital picture signal from a recording medium such as a magnetic disc, a magnetic tape, or an optical disc. The recording and reproducing section 3 outputs the reproduced digital picture signal to the MPEG2 expanding section 4. The MPEG2 expanding section 4 decodes and expands the output signal of the recording and reproducing section 3 into a 4:2:0 digital picture signal according to an expansively decoding process based on the MPEG2 standards. The MPEG2 expanding section 4 outputs the 4:2:0 digital picture signal to the 4:2:0/4:1:1 converting section 5. The MPEG2 expanding section 4 may also output the 4:2:0 digital picture signal to an external device or another device (not shown). The 4:2:0/4:1:1 converting section 5 converts the 4:2:0 digital picture signal into a 4:1:1 digital picture signal. The 4:2:0/4:1:1 converting section 5 outputs the 4:1:1 digital picture signal.

Figure 2:
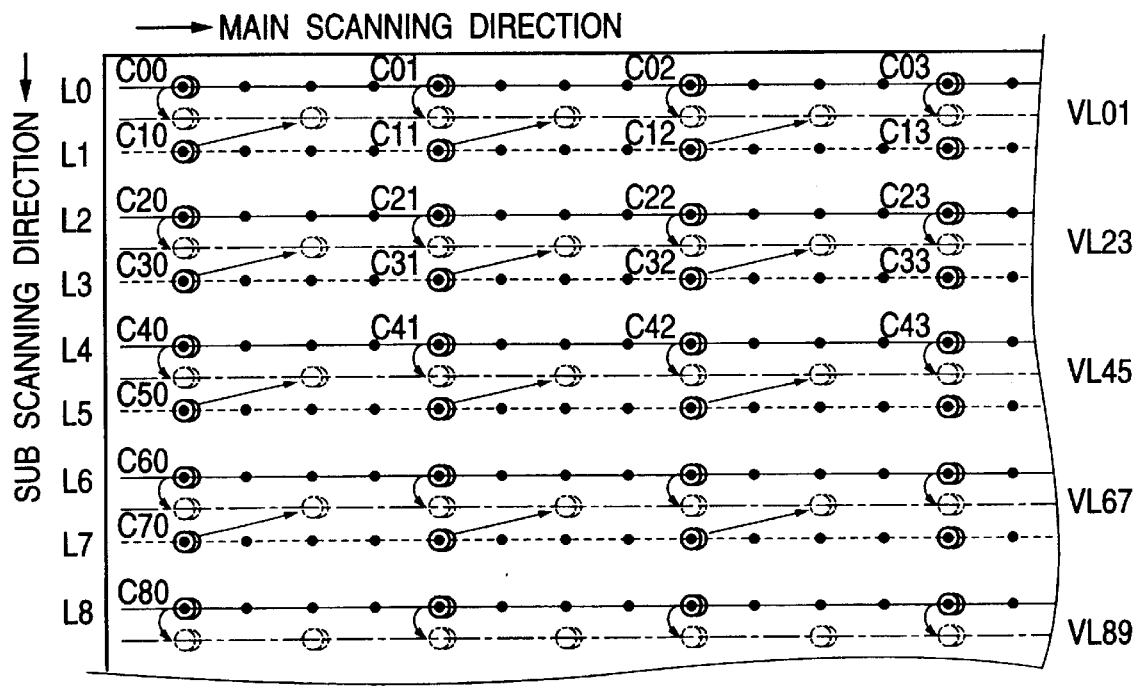
FIG. 2 is a diagram of scanning lines, and sample points of digital luminance and color difference signals handled in the apparatus of FIG. 1.

With reference to FIG. 2, L0, L2, L4, . . . denote even-numbered horizontal scanning lines respectively, and L1, L3, L5, . . . denote odd-numbered horizontal scanning lines respectively. In FIG. 2, the small black circles on the scanning lines L0, L1, L2, . . . denote points (sample points) corresponding to respective samples of the digital Y signal in the input 4:1:1 digital picture signal. In addition, the white circles having the solid-line circumferences and being on the scanning lines L0, L1, L2, . . . denote points (sample points) C00, C01, C02, C03, . . . corresponding to samples of the digital Cr and Cb signals in the input 4:1:1 digital picture signal. Specifically, each color-signal sample point corresponds to a pair of a sample of the digital Cr signal and a sample of the digital Cb signal. In view of this fact, the circumference of each white circle denoting a color-signal sample point has a double-line portion.

In the case where the input 4:1:1 digital picture signal is of a non-interlaced scanning type, the color-signal sample points C00, C01, C02, C03, are scanned in the following order.

C00, C01, C02, C03, . . . , C10, C11, C12, C13, . . . , C20, C21, C22, C23, . . . , C30, C31, C32, C33, . . . .

With reference to FIG. 2, the actual scanning lines L0, L1, L2, . . . are grouped into pairs each having two successive lines. Virtual scanning lines VL01, VL23, VL45, . . . are set which correspond to the respective pairs of the actual scanning lines L0, L1, L2, . . . . The positions of the virtual scanning lines VL01, VL23, VL45, . . . differ from the positions of the actual scanning lines L0, L1, L2, . . . . Specifically, each virtual scanning line extends between two successive actual scanning lines in the corresponding pair. For example, the virtual scanning line VL01 extends between the actual scanning lines L0 and L1, and the virtual scanning line VL23 extends between the actual scanning lines L2 and L3. Accordingly, one virtual scanning line corresponds to two actual scanning lines.

The signal conversion implemented by the 4:1:1/4:2:0 converting section 1 includes a step which is equivalent to rearranging movement of the color-signal sample points C00, C01, C02, C03, . . . to new positions on the virtual scanning lines VL01, VL23, VL45, . . . . In FIG. 2, the new positions on the virtual scanning lines VL01, VL23, VL45, . . . are denoted by the white circles having the broken-line circumferences. As a result of the rearranging movement, the color-signal sample points C00, C01, C02, C03, . . . are arranged in the following order.

C00, C10, C01, C11, C02, C12, C03, . . . , C20, C30, C21, C31, C22, C32, C23, . . . .

The signal conversion implemented by the 4:1:1/4:2:0 converting section 1 further includes a step of implementing a color-signal control process such that only samples of the digital Cr signal are outputted for an even-numbered actual scanning line, and only samples of the digital Cb signal are outputted for an odd-numbered actual scanning line. Specifically, for the actual scanning line L0, Cr-signal sample points C00(Cr), C01(Cr), C02(Cr), C03(Cr), . . . are scanned in the order as "C00(Cr), C10(Cr), C01(Cr), C11(Cr), C02(Cr), C12(Cr), C03(Cr), . . . ". For the actual scanning line L1, Cb-signal sample points C00(Cb), C01(Cb), C02(Cb), C03(Cb), . . . are scanned in the order as "C00(Cb), C10(Cb), C01(Cb), C11(Cb), C02(Cb), C12(Cb), C03(Cb), . . . ". For each of the later actual scanning lines L2, L4, L6, . . . , Cr-signal sample points are scanned in the order similar to the previously-mentioned case. For each of the later actual scanning lines L3, L5, L7, . . . , Cb-signal sample points are scanned in the order similar to the previously-mentioned case. Thus, the input 4:1:1 digital picture signal is converted into a 4:2:0 digital picture signal.

The 4:1:1/4:2:0 converting section 1 does not process the digital Y signal in the input 4:1:1 digital picture signal. In other words, the 4:1:1/4:2:0 converting section 1 transmits and outputs the digital Y signal as it is.

The 4:1:1/4:2:0 converting section 1 includes a memory, a first circuit for sequentially writing samples of the input 4:1:1 digital picture signal into the memory, and a second circuit for reading signal samples from the memory in the order which corresponds to the 4:2:0 signal format.

A comparative example of conversion from a 4:1:1 digital picture signal into a 4:2:0 digital picture signal will be taken. According to the comparative example, samples of digital Cr and Cb signals in the conversion-resultant 4:2:0 digital picture signal are arranged in the order determined by the following processes. For the actual scanning line L0, Cr-signal sample points are scanned in the order as "C00 (Cr), C01(Cr), C02(Cr), C03(Cr), . . . ". For the actual scanning line L1, Cb-signal sample points are scanned in the order as "C00(Cb), C01(Cb), C02(Cb), C03(Cb), . . . ". For the actual scanning line L2, Cr-signal sample points are scanned in the order as "C20(Cr), C21(Cr), C22(Cr), C23 (Cr), . . . ". For the actual scanning line L3, Cb-signal sample points are scanned in the order as "C20(Cb), C21(Cb), C22(Cb), C23(Cb), . . . ". Thus, according to the comparative example, color-signal sample points C10, C11, C12, C13, . . . , C30, C31, C32, C33, . . . are unscanned so that the resultant signal conversion is substantially equivalent to signal conversion from a 4:1:1 digital picture signal into a 4:1:0 digital picture signal. Accordingly, the 4:2:0 digital picture signal generated by the comparative example is decreased in vertical-direction color-signal resolution relative to the input 4:1:1 digital picture signal. On the other hand, the signal conversion implemented by the 4:1:1/4:2:0 converting section 1 does not cause such a decrease in vertical-direction color-signal resolution.

With reference back to FIG. 1, the 4:1:1/4:2:0 converting section 1 outputs the 4:2:0 digital picture signal to the MPEG2 compressing section 2. The MPEG2 compressing section 2 encodes and compresses the 4:2:0 digital picture signal into a compression-resultant digital picture signal according to the compressively encoding process based on the MPEG2 standards. Since the distance between neighboring sample points Cij and C(i+1)j, for example, sample points C00 and C10, is relatively short as viewed in a frame, a great reduction in the efficiency of the signal compression by the MPEG2 compressing section 2 hardly occurs. The MPEG2 compressing section 2 outputs the compression-resultant digital picture signal to the recording and reproducing section 3. The recording and reproducing section 3 records the output signal of the MPEG2 compressing section 2 on a recording medium such as a magnetic disc, a magnetic tape, or an optical disc.

As previously mentioned, the recording and reproducing section 3 reproduces a digital picture signal from a recording medium such as a magnetic disc, a magnetic tape, or an optical disc. The recording and reproducing section 3 outputs the reproduced digital picture signal to the MPEG2 expanding section 4. The MPEG2 expanding section 4 decodes and expands the output signal of the recording and reproducing section 3 into a 4:2:0 digital picture signal according to the expansively decoding process based on the MPEG2 standards. The MPEG2 expanding section 4 outputs the 4:2:0 digital picture signal to the 4:2:0/4:1:1 converting section 5. The MPEG2 expanding section 4 may also output the 4:2:0 digital picture signal to an external device or another device (not shown). The 4:2:0/4:1:1 converting section 5 converts the 4:2:0 digital picture signal into a 4:1:1 digital picture signal. The 4:2:0/4:1:1 converting section 5 outputs the 4:1:1 digital picture signal.

The signal conversion by the 4:2:0/4:1:1 converting section 5 is inverse with respect to the signal conversion by the 4:1:1/4:2:0 converting section 1. Specifically, the signal conversion by the 4:2:0/4:1:1 converting section 5 includes a step of separating color-signal samples in the 4:2:0 digital picture signal into a plurality of groups (sequences), a step of assigning the groups to after-conversion actual scanning lines, and a step of moving the color-signal samples to the after-conversion actual scanning lines according to the group-line assignment. For example, regarding the actual scanning line L0, Cr-signal samples in the 4:2:0 digital picture signal which correspond to respective sample points C00(Cr), C10(Cr), C01(Cr), C11(Cr), C02(Cr), C12(Cr), C03(Cr), . . . are separated into a first group of Cr-signal samples corresponding to respective sample points C00(Cr), C01(Cr), C02(Cr), C03(Cr), . . . and a second group of Cr-signal samples corresponding to respective sample points C10(Cr), C11(Cr), C12(Cr), . . . . The first group is assigned to the after-conversion actual scanning line L0 while the second group is assigned to the after-conversion actual scanning line L1. The Cr-signal samples in the first group are moved to the after-conversion actual scanning line L0 while the Cr-signal samples in the second group are moved to the after-conversion actual scanning line L1. Regarding the actual scanning line L0, Cb-signal samples in the 4:2:0 digital picture signal which correspond to respective sample points C00(Cb), C10(Cb), C01(Cb), C11(Cb), C02(Cb), C12(Cb), C03(Cb), . . . are separated into a first group of Cb-signal samples corresponding to respective sample points C00(Cb), C01(Cb), C02(Cb), C03(Cb), . . . and a second group of Cb-signal samples corresponding to respective sample points C10(Cb), C11(Cb), C12(Cb), . . . . The first group is assigned to the after-conversion actual scanning line L0 while the second group is assigned to the after-conversion actual scanning line L1. The Cb-signal samples in the first group are moved to the after-conversion actual scanning line L0 while the Cb-signal samples in the second group are moved to the after-conversion actual scanning line L1. Thus, the 4:2:0 digital picture signal is converted into a 4:1:1 digital picture signal.

The 4:2:0/4:1:1 converting section 5 does not process the digital Y signal in the 4:2:0 digital picture signal. In other words, the 4:2:0/4:1:1 converting section 5 transmits and outputs the digital Y signal as it is.

The 4:2:0/4:1:1 converting section 5 includes a memory, a first circuit for sequentially writing samples of the 4:2:0 digital picture signal into the memory, and a second circuit for reading signal samples from the memory in the order which corresponds to the 4:1:1 signal format.

Second Embodiment

Figure 3:
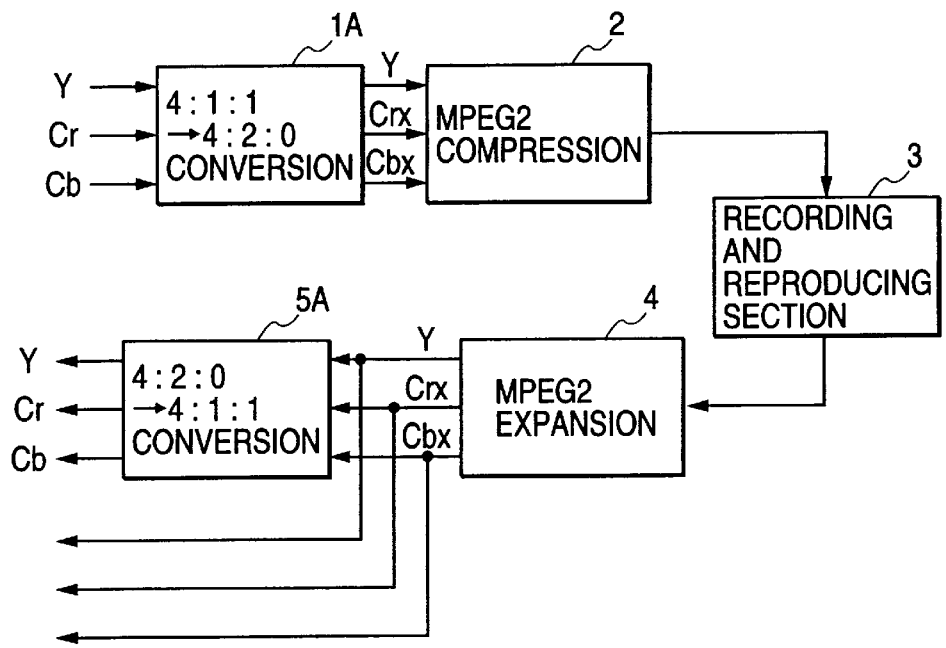
FIG. 3 is a block diagram of a portion of a recording and reproducing apparatus according to a second embodiment of this invention.

FIG. 3 shows a portion of an apparatus for recording and reproducing digital picture signals according to a second embodiment of this invention. The recording and reproducing apparatus of FIG. 3 is similar to the recording and reproducing apparatus of FIG. 1 except that a 4:1:1/4:2:0 converting section 1A and a 4:2:0/4:1:1 converting section 5A replace the 4:1:1/4:2:0 converting section 1 and the 4:2:0/4:1:1 converting section 5 (see FIG. 1) respectively. The 4:1:1/4:2:0 converting section 1A differs from the 4:1:1/4:2:0 converting section 1 in the points explained later. The 4:2:0/4:1:1 converting section 5A differs from the 4:2:0/4:1:1 converting section 5 in the points explained later.

Figure 4:
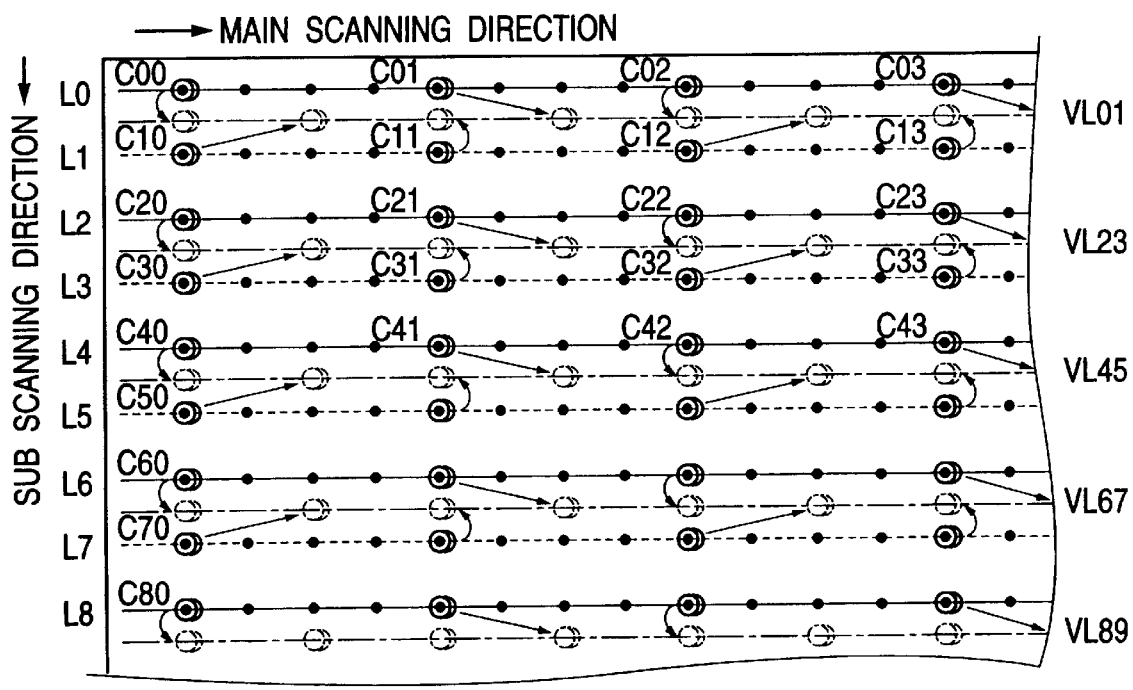
FIG. 4 is a diagram of scanning lines, and sample points of digital luminance and color difference signals handled in the apparatus of FIG. 3.

With reference to FIGS. 3 and 4, the 4:1:1/4:2:0 converting section 1A implements signal conversion including a step which is equivalent to rearranging movement of color-signal sample points C00, C01, C02, C03, . . . to new positions on virtual scanning lines VL01, VL23, VL45, . . . . In FIG. 4, the new positions on the virtual scanning lines VL01, VL23, VL45, . . . are denoted by the white circles having the broken-line circumferences. As a result of the rearranging movement, the color-signal sample points C00, C01, C02, C03, . . . are arranged in the following order.

C00, C10, C11, C01, C02, C12, C13, . . . , C20, C30, C31, C21, C22, C32, C33, . . . .

The above-mentioned rearranging movement allows sample points nearest each other in a frame to be adjacent to each other on an after-conversion virtual scanning line.

The signal conversion implemented by the 4:1:1/4:2:0 converting section 1A further includes a step of implementing a color-signal control process such that only samples of the digital Cr signal are outputted for an even-numbered actual scanning line, and only samples of the digital Cb signal are outputted for an odd-numbered actual scanning line.

The 4:2:0/4:1:1 converting section 5A implements signal conversion inverse with respect to the signal conversion by the 4:1:1/4:2:0 converting section 1A.

Third Embodiment

Figure 5:
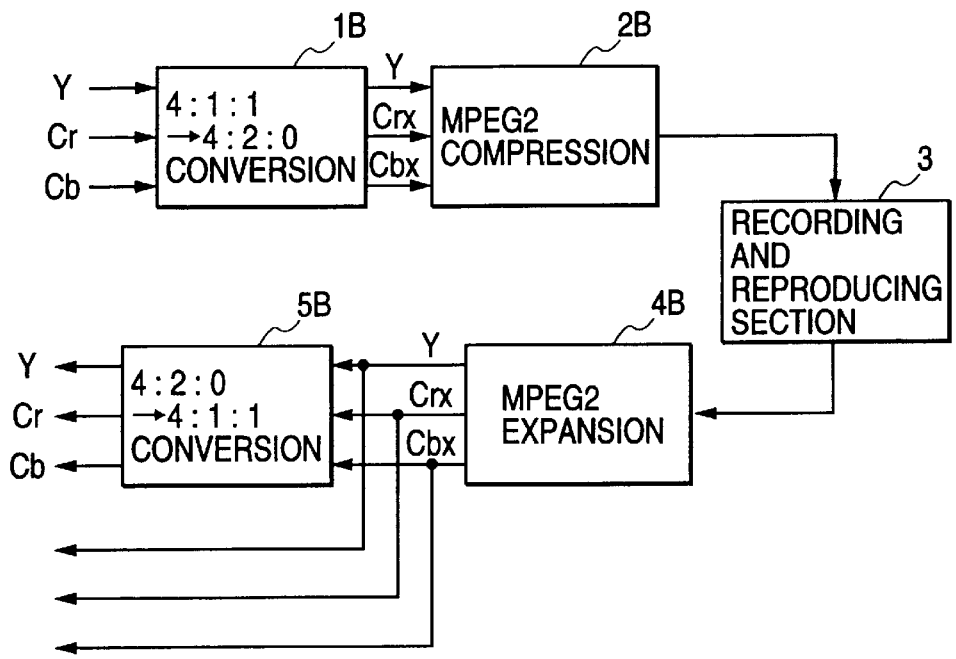
FIG. 5 is a block diagram of a portion of a recording and reproducing apparatus according to a third embodiment of this invention.

FIG. 5 shows a portion of an apparatus for recording and reproducing digital picture signals according to a third embodiment of this invention. The recording and reproducing apparatus of FIG. 5 is similar to the recording and reproducing apparatus of FIG. 1 except that a 4:1:1/4:2:0 converting section 1B, an MPEG2 compressing section 2B, an MPEG2 expanding section 4B, and a 4:2:0/4:1:1 converting section 5B replace the 4:1:1/4:2:0 converting section 1, the MPEG2 compressing section 2, the MPEG2 expanding section 4, and the 4:2:0/4:1:1 converting section 5 (see FIG. 1) respectively. The 4:1:1/4:2:0 converting section 1B differs from the 4:1:1/4:2:0 converting section 1 in the points explained later. The MPEG2 compressing section 2B differs from the MPEG2 compressing section 2 in the points explained later. The MPEG2 expanding section 4B differs from the MPEG2 expanding section 4 in the points explained later. The 4:2:0/4:1:1 converting section 5B differs from the 4:2:0/4:1:1 converting section 5 in the points explained later.

The MPEG2 compressing section 2B implements an intra-field compression process. The MPEG2 expanding section 4B implements a signal expansion process which is inverse with respect to the signal compression process by the MPEG2 compressing section 2B.

Figure 6:
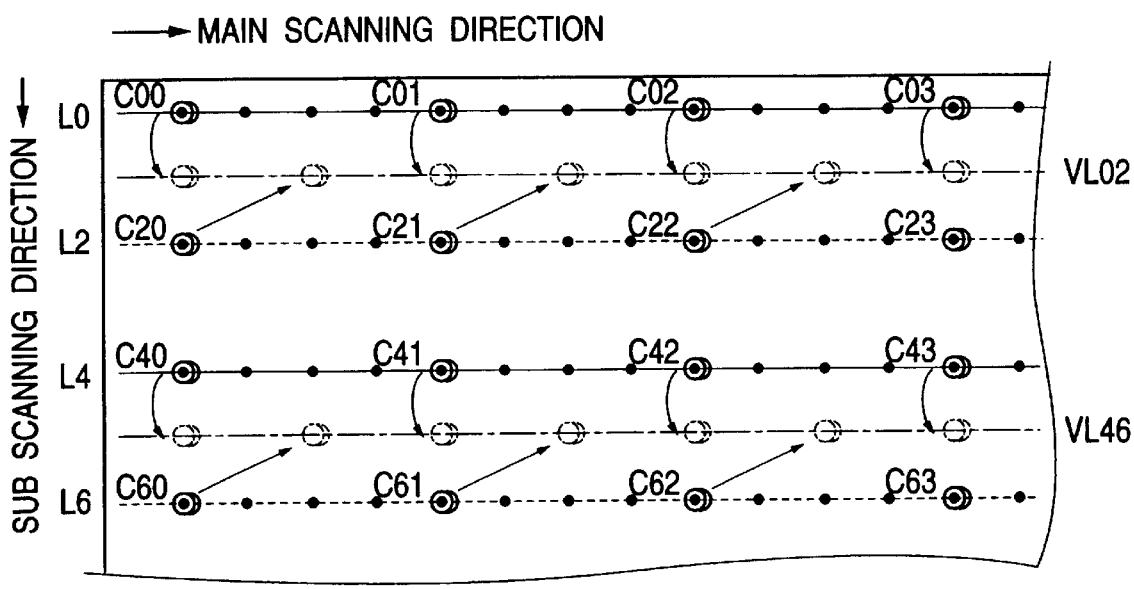
FIG. 6 is a diagram of scanning lines, and sample points of digital luminance and color difference signals handled in the apparatus of FIG. 5.

With reference to FIGS. 5 and 6, for every even-numbered field, the 4:1:1/4:2:0 converting section 1B implements signal conversion including a step which is equivalent to rearranging movement of color-signal sample points C00, C01, C02, C03, . . . to new positions on virtual scanning lines VL02, VL46, . . . . In FIG. 6, the new positions on the virtual scanning lines VL02, VL46, . . . are denoted by the white circles having the broken-line circumferences. As a result of the rearranging movement for the even-numbered field, the color-signal sample points C00, C01, C02, C03, . . . are arranged in the following order.

C00, C20, C01, C21, C02, C22, C03, . . . , C40, C60, C41, C61, C42, C62, C43, . . . .

For every odd-numbered field, the 4:1:1/4:2:0 converting section 1B implements signal conversion including a step which is equivalent to rearranging movement of color-signal sample points C10, C11, C12, C13, . . . to new positions on virtual scanning lines. As a result of the rearranging movement for the odd-numbered field, the color-signal sample points C10, C11, C12, C13, . . . are arranged in the following order.

C10, C30, C11, C31, C12, C32, C13, . . . , C50, C70, C51, C71, C52, C72, C53, . . . .

The 4:2:0/4:1:1 converting section 5B implements signal conversion inverse with respect to the signal conversion by the 4:1:1/4:2:0 converting section 1B.

Fourth Embodiment

Figure 7:
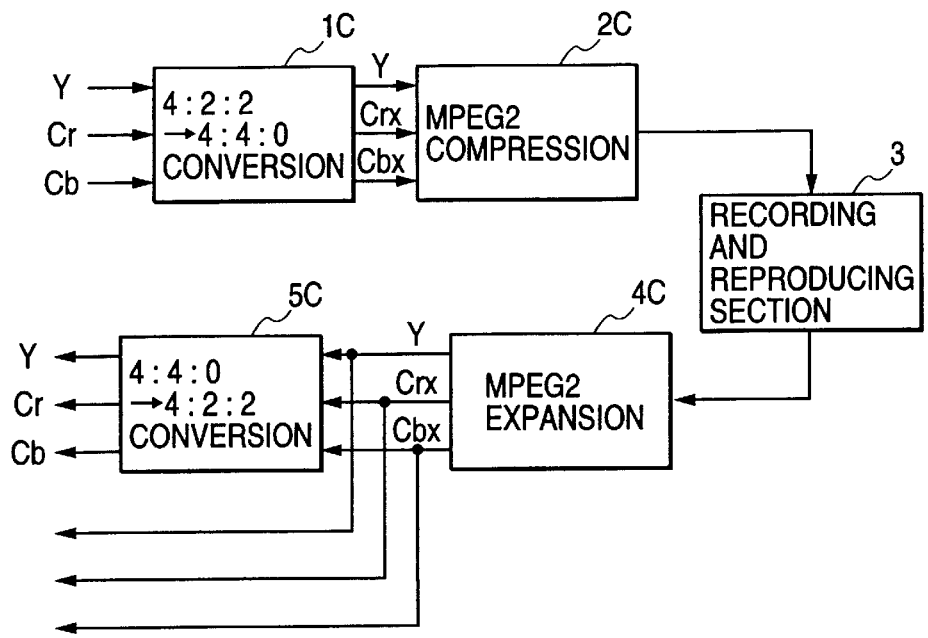
FIG. 7 is a block diagram of a portion of a recording and reproducing apparatus according to a fourth embodiment of this invention.

FIG. 7 shows a portion of an apparatus for recording and reproducing digital picture signals according to a fourth embodiment of this invention. The recording and reproducing apparatus of FIG. 7 is designed to handle digital picture signals in which the predetermined integer "n" is set to 2.

The recording and reproducing apparatus of FIG. 7 is similar to the recording and reproducing apparatus of FIG. 1 except that a 4:2:2/4:4:0 converting section 1C, a compressing section 2C, an expanding section 4C, and a 4:4:0/4:2:2 converting section 5C replace the 4:1:1/4:2:0 converting section 1, the MPEG2 compressing section 2, the MPEG2 expanding section 4, and the 4:2:0/4:1:1 converting section 5 (see FIG. 1) respectively.

During a recording mode of operation of the apparatus, a 4:2:2 digital picture signal is inputted into the 4:2:2/4:4:0 converting section 1C. The input 4:2:2 digital picture signal is composed of digital component video signals (digital Y, Cr, and Cb signals). Here, the Y signal means a luminance signal. In addition, the Cr signal means an R-Y signal (a first color difference signal) while the Cb signal means a B-Y signal (a second color difference signal). For example, the digital component video signals are generated as follows. The digital component video signals are derived from analog component video signals (analog Y, Cr, and Cb signals) through an analog-to-digital conversion process. Specifically, during the analog-to-digital conversion process, the analog Y, Cr, and Cb signals are sampled at given sampling frequencies respectively, and then the samples of the analog Y, Cr, and Cb signals are digitized. The ratio among the sampling frequencies for the respective analog Y, Cr, and Cb signals is "4:2:2".

During the recording mode of operation of the apparatus, the 4:2:2/4:4:0 converting section 1C converts the input 4:2:2 digital picture signal into a 4:4:0 digital picture signal. The 4:2:2/4:4:0 converting section 1C outputs the 4:4:0 digital picture signal to the compressing section 2C. The compressing section 2C encodes and compresses the 4:4:0 digital picture signal into a compression-resultant digital picture signal. The compressing section 2C outputs the compression-resultant digital picture signal to a recording and reproducing section 3. The recording and reproducing section 3 records the output signal of the compressing section 2C on a recording medium such as a magnetic disc, a magnetic tape, or an optical disc.

During a playback mode of operation of the apparatus, the recording and reproducing section 3 reproduces a digital picture signal from a recording medium such as a magnetic disc, a magnetic tape, or an optical disc. The recording and reproducing section 3 outputs the reproduced digital picture signal to the expanding section 4C. The expanding section 4C decodes and expands the output signal of the recording and reproducing section 3 into a 4:4:0 digital picture signal. The signal processing by the expanding section 4C is inverse with respect to the signal processing by the compressing section 2C. The expanding section 4C outputs the 4:4:0 digital picture signal to the 4:4:0/4:2:2 converting section 5C. The expanding section 4C may also output the 4:4:0 digital picture signal to an external device or another device (not shown). The 4:4:0/4:2:2 converting section 5C converts the 4:4:0 digital picture signal into a 4:2:2 digital picture signal. The 4:4:0/4:2:2 converting section 5C outputs the 4:2:2 digital picture signal.

The fourth embodiment of this invention may be combined with the second or third embodiment thereof.

Fifth Embodiment

Figure 8:
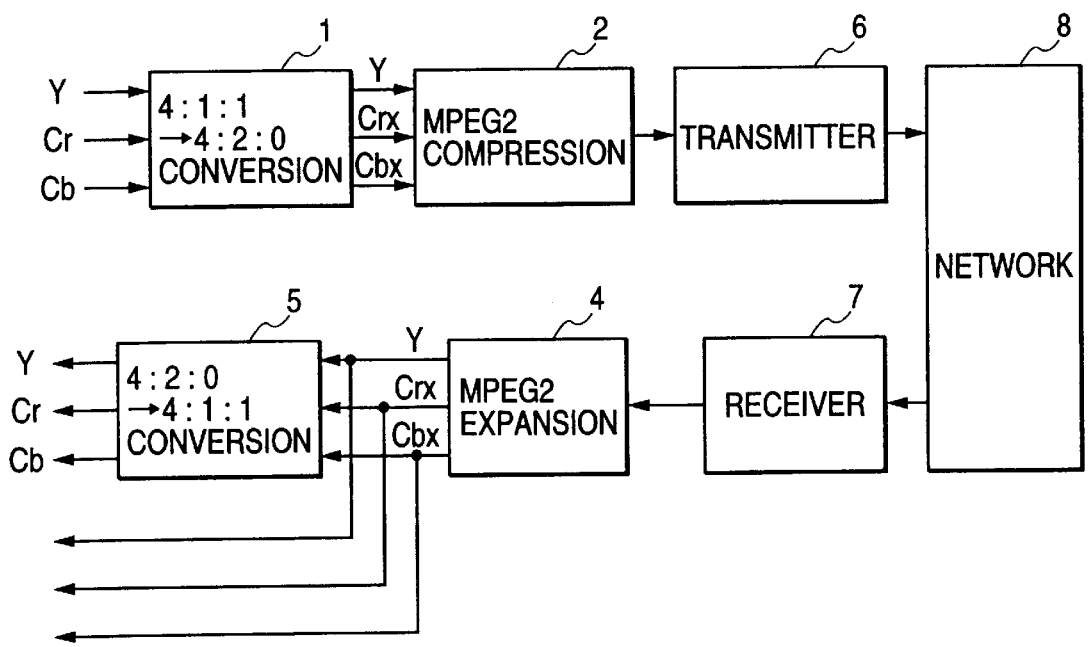
FIG. 8 is a block diagram of a transmitting and receiving apparatus according to a fifth embodiment of this invention.

FIG. 8 shows an apparatus for transmitting and receiving digital picture signals according to a fifth embodiment of this invention. The apparatus of FIG. 8 is similar to the apparatus of FIG. 1 except for design changes mentioned later. The apparatus of FIG. 8 includes a transmitter 6 and a receiver 7. The apparatus of FIG. 8 does not have the recording and reproducing section 3 (see FIG. 1).

As shown in FIG. 8, the transmitter 6 follows an MPEG2 compressing section 2. The transmitter 6 is connected to a transmission line formed by, for example, a communication network 8. The receiver 7 is connected to a transmission line formed by, for example, the communication network 8. The receiver 7 is followed by an MPEG2 expanding section 4.

The MPEG2 compressing section 2 outputs a compression-resultant digital picture signal to the transmitter 6. The transmitter 6 modifies the output signal of the MPEG2 compressing section 2 into a prescribed communication format. The transmitter 6 outputs the resultant digital picture signal to the transmission line (the communication network 8).

The receiver 7 accepts a digital picture signal of the prescribed communication format from the transmission line (the communication network 8). The receiver 7 de-formats the accepted digital picture signal. The receiver 7 outputs the resultant digital picture signal to the MPEG2 expanding section 4.

The fifth embodiment of this invention may be combined with one of the second, third, and fourth embodiments thereof.

Sixth Embodiment

Figure 9:
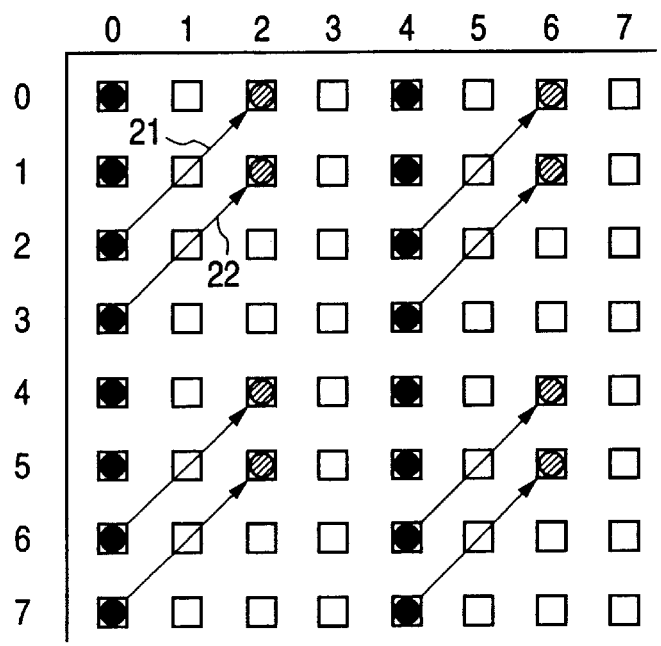
FIG. 9 is a diagram of sample points (pixel points) of digital luminance and color difference signals, and shifts of color-difference-signal pixel points in a first pixel displacement method according to a sixth embodiment of this invention.

FIG. 9 relates to a first method of displacing color-difference signal pixel positions (sample points) in every field picture to convert a 4:1:1 digital picture signal into a 4:2:0 digital picture signal. FIG. 9 shows pixel positions on a portion of a frame represented by a 4:1:1 digital picture signal. In FIG. 9, the white squares denote respective pixel positions (sample points) of a digital luminance signal in the 4:1:1 digital picture signal, and the black circles denote respective pixel positions (sample points) of a digital color difference signal in the 4:1:1 digital picture signal. In addition, the gray circles denote respective after-displacement pixel positions (sample points) of the digital color difference signal which coincide with pixel positions where only pixels of the digital luminance signal exist under the original conditions. Here, the digital color difference signal means each of a digital Cr signal and a digital Cb signal. The first displacement method processes the digital Cr signal and the digital Cb signal in similar ways.

Every frame represented by the 4:1:1 digital picture signal is composed of 360 samples by 480 lines (or 720 samples by 480 lines). Here, "lines" are short for "scanning lines". FIG. 9 shows only a 8-pixel-by-8-line portion of a frame represented by the 4:1:1 digital picture signal. For every line, serial order numbers from "0" to "359" (or "0" to "719") are assigned to 360 samples (or 720 samples) respectively along the rightward direction. For every frame, serial order numbers from "0" to "479" are assigned to 480 lines along the downward direction.

In the first displacement method, some of pixel positions (sample points) of a digital color difference signal, that is, each of a digital Cr signal and a digital Cb signal, are shifted in the signal processing world as follows. The position of every pixel relative to a frame is expressed by the order number of the pixel and the order number of the line on which the pixel extends. Under the original conditions, pixels (samples) of the color difference signal exist only at positions determined by given pixel order numbers equal to multiples of 4, that is, 0, 4, 8, . . . .

For a first field, first selected pixels (samples) of the digital color difference signal are shifted rightward by a distance corresponding to two pixels, and are shifted upward by a distance corresponding to two lines. The first selected pixels are at positions determined by first prescribed pixel order numbers and first prescribed line order numbers. The first prescribed pixel order numbers are equal to integers which are exactly divisible by 4. Specifically, the first prescribed pixel order numbers are equal to 0, 4, 8, 12, . . . . The first prescribed line order numbers are equal to integers which correspond to remainders of 2 if they are divided by 4. Specifically, the first prescribed line order numbers are equal to 2, 6, 10, 14, . . . . For a second field, second selected pixels (samples) of the digital color difference signal are shifted rightward by a distance corresponding to two pixels, and are shifted upward by a distance corresponding to two lines. The second selected pixels are at positions determined by second prescribed pixel order numbers and second prescribed line order numbers. The second prescribed pixel order numbers are equal to integers which are exactly divisible by 4. Specifically, the second prescribed pixel order numbers are equal to 0, 4, 8, 12, . . . . The second prescribed line order numbers are equal to integers which correspond to remainders of 3 if they are divided by 4. Specifically, the second prescribed line order numbers are equal to 3, 7, 11, 15, . . . .

Examples of pixel shifts will be indicated hereinafter. With reference to FIG. 9, as denoted by the arrow 21, the pixel of the color difference signal at a position determined by the pixel order number "0" and the line order number "2" is shifted to a position determined by the pixel order number "2" and the line order number "0" for the first field. As denoted by the arrow 22, the pixel of the color difference signal at a position determined by the pixel order number "0" and the line order number "3" is shifted to a position determined by the pixel order number "2" and the line order number "1" for the second field.

The positions to which the first selected pixels are shifted do not have pixels of the color difference signal under the original conditions. In more detail, the positions to which the first selected pixels are shifted are determined by third prescribed prescribed pixel order numbers and third prescribed line order numbers. The third prescribed pixel order numbers are equal to integers which correspond to remainders of 2 if they are divided by 4. Specifically, the third prescribed pixel order numbers are equal to 2, 6, 10, 14, . . . . The third prescribed line order numbers are equal to integers which are exactly divisible by 4. Specifically, the third prescribed line order numbers are equal to 0, 4, 8, 12, . . . . The positions to which the second selected pixels are shifted do not have pixels of the color difference signal under the original conditions. In more detail, the positions to which the second selected pixels are shifted are determined by fourth prescribed prescribed pixel order numbers and fourth prescribed line order numbers. The fourth prescribed pixel order numbers are equal to integers which correspond to remainders of 2 if they are divided by 4. Specifically, the fourth prescribed pixel order numbers are equal to 2, 6, 10, 14, . . . . The fourth prescribed line order numbers are equal to integers which correspond to remainders of 1 if they are divided by 4. Specifically, the fourth prescribed line order numbers are equal to 1, 5, 9, 13, . . . .

As a result of the pixel shifts in the first displacement method, the total number of pixels (samples) of the color difference signal per every specified line is doubled while the total number of lines in every field or every frame on which color-difference-signal pixels (samples) exist is halved. Thus, the pixel shifts in the first displacement method rearranges color-difference-signal pixels into a configuration accorded with the 4:2:0 signal format.

Figure 10:
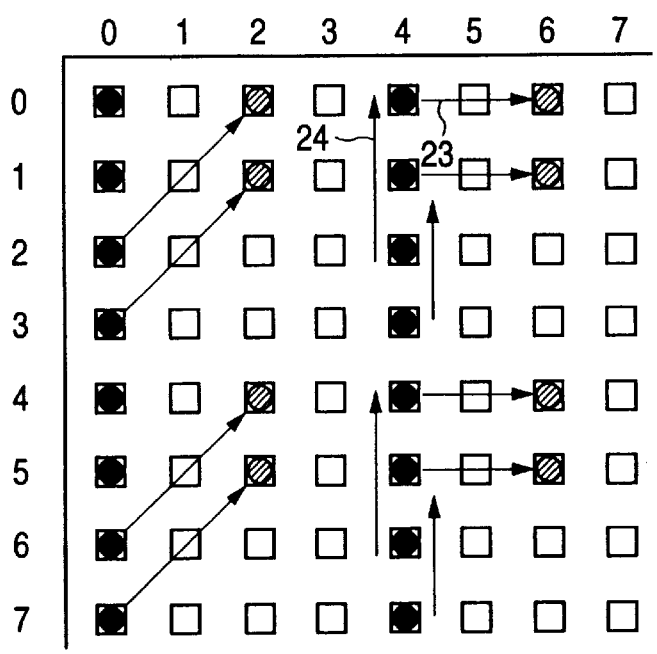
FIG. 10 is a diagram of sample points (pixel points) of digital luminance and color difference signals, and shifts of color-difference-signal pixel points in a second pixel displacement method according to the sixth embodiment of this invention.

FIG. 10 similar to FIG. 9 relates to a second method of displacing color-difference-signal pixel positions (sample points) in every field picture to convert a 4:1:1 digital picture signal into a 4:2:0 digital picture signal. In the second displacement method, some of pixel positions (sample points) of a digital color difference signal, that is, each of a digital Cr signal and a digital Cb signal, are shifted in the signal processing world as follows. The position of every pixel relative to a frame is expressed by the order number of the pixel and the order number of the line on which the pixel extends. The second displacement method processes the digital Cr signal and the digital Cb signal in similar ways.

According to the second displacement method, for a first field, first selected pixels (samples) of the digital color difference signal are shifted rightward by a distance corresponding to two pixels, and are shifted upward by a distance corresponding to two lines. The first selected pixels are at positions determined by first prescribed pixel order numbers and first prescribed line order numbers. The first prescribed pixel order numbers are equal to integers which are exactly divisible by 8. Specifically, the first prescribed pixel order numbers are equal to 0, 8, 16, . . . . The first prescribed line order numbers are equal to integers which correspond to remainders of 2 if they are divided by 4. Specifically, the first prescribed line order numbers are equal to 2, 6, 10, 14, . . . . For the first field, second selected pixels (samples) of the digital color difference signal are shifted rightward by a distance corresponding to two pixels. The second selected pixels are at positions determined by second prescribed pixel order numbers and second prescribed line order numbers. The second prescribed pixel order numbers are equal to integers which correspond to remainders of 4 if they are divided by 8. Specifically, the second prescribed pixel order numbers are equal to 4, 12, 20, . . . . The second prescribed line order numbers are equal to integers which are exactly divisible by 4. Specifically, the second prescribed line order numbers are equal to 0, 4, 8, 12, . . . . Subsequently, third selected pixels are shifted as follows. For the first field, third selected pixels (samples) of the digital color difference signal are shifted upward by a distance corresponding to two lines. The third selected pixels are at positions determined by third prescribed pixel order numbers and third prescribed line order numbers. The third prescribed pixel order numbers are equal to integers which correspond to remainders of 4 if they are divided by 8. Specifically, the third prescribed pixel order numbers are equal to 4, 12, 20, . . . . The third prescribed line order numbers are equal to integers which correspond to remainders of 2 if they are divided by 4. Specifically, the third prescribed line order numbers are equal to 2, 6, 10, 14, . . . .

According to the second displacement method, for a second field, fourth selected pixels (samples) of the digital color difference signal are shifted rightward by a distance corresponding to two pixels, and are shifted upward by a distance corresponding to two lines. The fourth selected pixels are at positions determined by fourth prescribed pixel order numbers and fourth prescribed line order numbers. The fourth prescribed pixel order numbers are equal to integers which are exactly divisible by 8. Specifically, the fourth prescribed pixel order numbers are equal to 0, 8, 16, . . . . The fourth prescribed line order numbers are equal to integers which correspond to remainders of 3 if they are divided by 4. Specifically, the fourth prescribed line order numbers are equal to 3, 7, 11, 15, . . . . For the second field, fifth selected pixels (samples) of the digital color difference signal are shifted rightward by a distance corresponding to two pixels. The fifth selected pixels are at positions determined by fifth prescribed pixel order numbers and fifth prescribed line order numbers. The fifth prescribed pixel order numbers are equal to integers which correspond to remainders of 4 if they are divided by 8. Specifically, the fifth prescribed pixel order numbers are equal to 4, 12, 20, . . . . The fifth prescribed line order numbers are equal to integers which correspond to remainders of 1 if they are divided by 4. Specifically, the fifth prescribed line order numbers are equal to 1, 5, 9, 13, . . . . Subsequently, sixth selected pixels are shifted as follows. For the second field, sixth selected pixels (samples) of the digital color difference signal are shifted upward by a distance corresponding to two lines. The sixth selected pixels are at positions determined by sixth prescribed pixel order numbers and sixth prescribed line order numbers. The sixth prescribed pixel order numbers are equal to integers which correspond to remainders of 4 if they are divided by 8. Specifically, the sixth prescribed pixel order numbers are equal to 4, 12, 20, . . . . The sixth prescribed line order numbers are equal to integers which correspond to remainders of 3 if they are divided by 4. Specifically, the sixth prescribed line order numbers are equal to 3, 7, 11, 15, . . . .

Examples of pixel shifts will be indicated hereinafter. With reference to FIG. 10, as denoted by the arrow 23, the pixel of the color difference signal at a position determined by the pixel order number "4" and the line order number "0" is shifted to a position determined by the pixel order number "6" and the line order number "0" for the first field. Subsequently, as denoted by the arrow 24, the pixel of the color difference signal at a position determined by the pixel order number "4" and the line order number "2" is shifted to the position determined by the pixel order number "4" and the line order number "0" for the first field.

As a result of the pixel shifts in the second displacement method, the total number of pixels (samples) of the color difference signal per every specified line is doubled while the total number of lines in every field or every frame on which color-difference-signal pixels (samples) exist is halved. Thus, the pixel shifts in the second displacement method rearranges color-difference-signal pixels into a configuration accorded with the 4:2:0 signal format.

Figure 11:
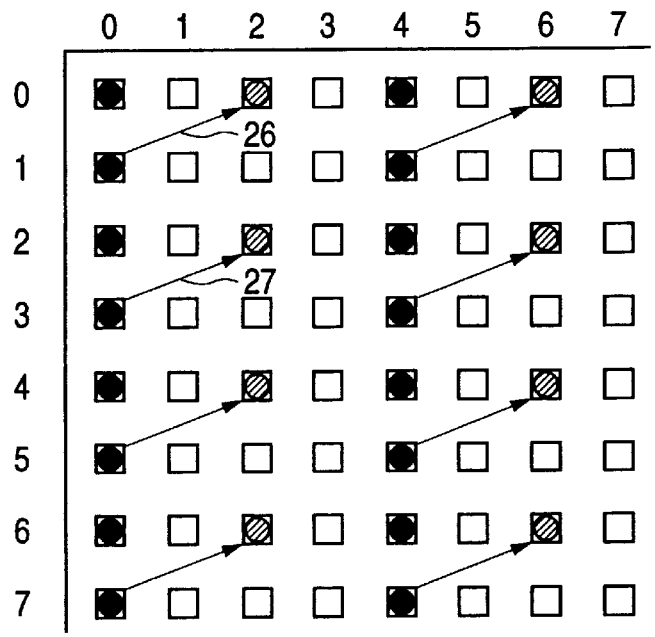
FIG. 11 is a diagram of sample points (pixel points) of digital luminance and color difference signals, and shifts of color-difference-signal pixel points in a third pixel displacement method according to the sixth embodiment of this invention.

FIG. 11 relates to a third method of displacing color-difference-signal pixel positions (sample points) in every frame picture to convert a 4:1:1 digital picture signal into a 4:2:0 digital picture signal. FIG. 11 shows pixel positions on a portion of a frame represented by a 4:1:1 digital picture signal. In FIG. 11, the white squares denote respective pixel positions (sample points) of a digital luminance signal in the 4:1:1 digital picture signal, and the black circles denote respective pixel positions (sample points) of a digital color difference signal in the 4:1:1 digital picture signal. In addition, the gray circles denote respective after-displacement pixel positions (sample points) of the digital color difference signal which coincide with pixel positions where only pixels of the digital luminance signal exist under the original conditions. Here, the digital color difference signal means each of a digital Cr signal and a digital Cb signal. The third displacement method processes the digital Cr signal and the digital Cb signal in similar ways.

Every frame represented by the 4:1:1 digital picture signal is composed of 360 samples by 480 lines (or 720 samples by 480 lines). FIG. 11 shows only a 8-pixel-by-8-line portion of a frame represented by the 4:1:1 digital picture signal. For every line, serial order numbers from "0" to "359" (or "0" to "719") are assigned to 360 samples (or 720 samples) respectively along the rightward direction. For every frame, serial order numbers from "0" to "479" are assigned to 480 lines along the downward direction.

In the third displacement method, some of pixel positions (sample points) of a digital color difference signal, that is, each of a digital Cr signal and a digital Cb signal, are shifted in the signal processing world as follows. The position of every pixel relative to a frame is expressed by the order number of the pixel and the order number of the line on which the pixel extends. For every frame, selected pixels (samples) of the digital color difference signal are shifted rightward by a distance corresponding to two pixels, and are shifted upward by a distance corresponding to one line. The selected pixels are at positions determined by first prescribed pixel order numbers and first prescribed line order numbers. The first prescribed pixel order numbers are equal to integers which are exactly divisible by 4. Specifically, the first prescribed pixel order numbers are equal to 0, 4, 8, 12, . . . . The first prescribed line order numbers are equal to integers which correspond to remainders of 1 if they are divided by 2. Specifically, the first prescribed line order numbers are equal to 1, 3, 5, 7, . . . .

Examples of pixel shifts will be indicated hereinafter. With reference to FIG. 11, as denoted by the arrow 26, the pixel of the color difference signal at a position determined by the pixel order number "0" and the line order number "1" is shifted to a position determined by the pixel order number "2" and the line order number "0". As denoted by the arrow 27, the pixel of the color difference signal at a position determined by the pixel order number "0" and the line order number "3" is shifted to a position determined by the pixel order number "2" and the line order number "2".

The positions to which the selected pixels are shifted do not have pixels of the color difference signal under the original conditions. In more detail, the positions to which the selected pixels are shifted are determined by second prescribed pixel order numbers and second prescribed line order numbers. The second prescribed pixel order numbers are equal to integers which correspond to remainders of 2 if they are divided by 4. Specifically, the second prescribed pixel order numbers are equal to 2, 6, 10, 14, . . . . The second prescribed line order numbers are equal to integers which are exactly divisible by 2. Specifically, the second prescribed line order numbers are equal to 0, 2, 4, 6, . . . .

As a result of the pixel shifts in the third displacement method, the total number of pixels (samples) of the color difference signal per every specified line is doubled while the total number of lines in every frame on which color-difference-signal pixels (samples) exist is halved. Thus, the pixel shifts in the third displacement method rearranges color-difference-signal pixels into a configuration accorded with the 4:2:0 signal format.

Figure 12:
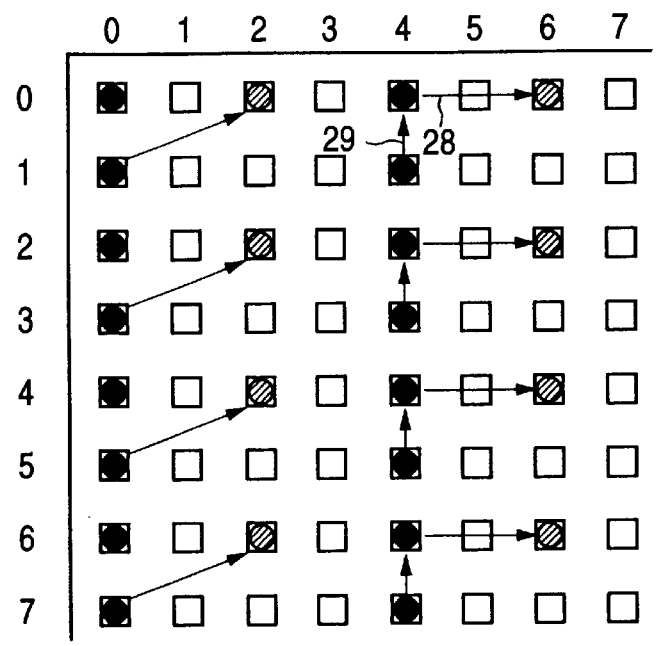
FIG. 12 is a diagram of sample points (pixel points) of digital luminance and color difference signals, and shifts of color-difference-signal pixel points in a fourth pixel displacement method according to the sixth embodiment of this invention.

FIG. 12 similar to FIG. 11 relates to a fourth method of displacing color-difference-signal pixel positions (sample points) in every frame picture to convert a 4:1:1 digital picture signal into a 4:2:0 digital picture signal. In the fourth displacement method, some of pixel positions (sample points) of a digital color difference signal, that is, each of a digital Cr signal and a digital Cb signal, are shifted in the signal processing world as follows. The position of every pixel relative to a frame is expressed by the order number of the pixel and the order number of the line on which the pixel extends. The fourth displacement method processes the digital Cr signal and the digital Cb signal in similar ways.

According to the fourth displacement method, for every frame, first selected pixels (samples) of the digital color difference signal are shifted rightward by a distance corresponding to two pixels, and are shifted upward by a distance corresponding to one line. The first selected pixels are at positions determined by first prescribed pixel order numbers and first prescribed line order numbers. The first prescribed pixel order numbers are equal to integers which are exactly divisible by 8. Specifically, the first prescribed pixel order numbers are equal to 0, 8, 16, . . . . The first prescribed line order numbers are equal to integers which correspond to remainders of 1 if they are divided by 2. Specifically, the first prescribed line order numbers are equal to 1, 3, 5, 7, . . . . For every frame, second selected pixels (samples) of the digital color difference signal are shifted rightward by a distance corresponding to two pixels. The second selected pixels are at positions determined by second prescribed pixel order numbers and second prescribed line order numbers. The second prescribed pixel order numbers are equal to integers which correspond to remainders of 4 if they are divided by 8. Specifically, the second prescribed pixel order numbers are equal to 4, 12, 20, . . . . The second prescribed line order numbers are equal to integers which are exactly divisible by 2. Specifically, the second prescribed line order numbers are equal to 0, 2, 4, 6, . . . . Subsequently, third selected pixels (samples) of the digital color difference signal are shifted upward by a distance corresponding to one line. The third selected pixels are at positions determined by third prescribed pixel order numbers and third prescribed line order numbers. The third prescribed pixel order numbers are equal to integers which correspond to remainders of 4 if they are divided by 8. Specifically, the third prescribed pixel order numbers are equal to 4, 12, 20, . . . . The third prescribed line order numbers are equal to integers which correspond to remainders of 1 if they are divided by 2. Specifically, the third prescribed line order numbers are equal to 1, 3, 5, 7, . . . .

Examples of pixel shifts will be indicated hereinafter. With reference to FIG. 12, as denoted by the arrow 28, the pixel of the color difference signal at a position determined by the pixel order number "4" and the line order number "0" is shifted to a position determined by the pixel order number "6" and the line order number "0". Subsequently, as denoted by the arrow 29, the pixel of the color difference signal at a position determined by the pixel order number "4" and the line order number "1" is shifted to the position determined by the pixel order number "4" and the line order number "0".

As a result of the pixel shifts in the fourth displacement method, the total number of pixels (samples) of the color difference signal per every specified line is doubled while the total number of lines in every frame on which color-difference-signal pixels (samples) exist is halved. Thus, that pixel shifts in the fourth displacement method rearranges color-difference-signal pixels into a configuration accorded with the 4:2:0 signal format.

Figure 13:
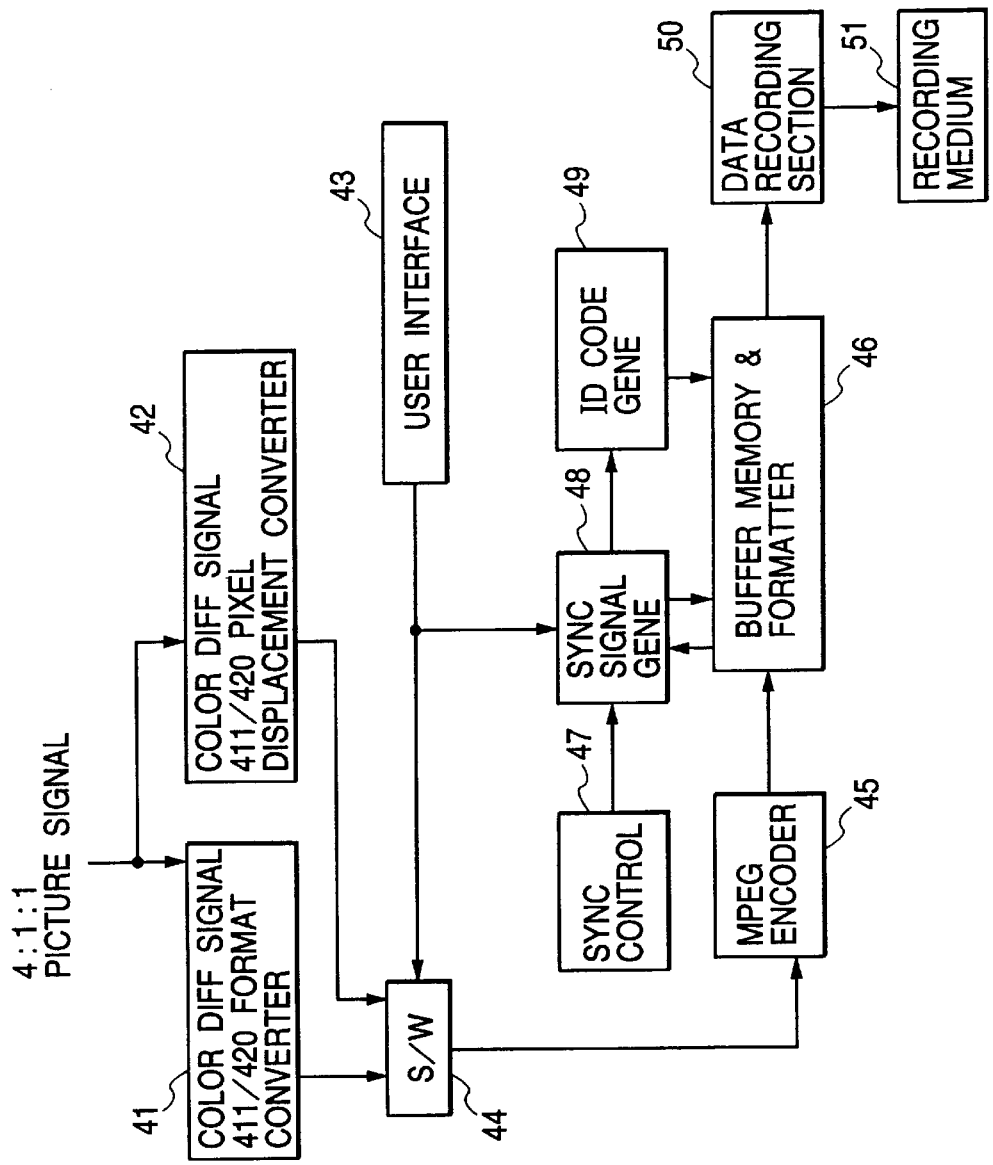
FIG. 13 is a block diagram of an encoding apparatus according to the sixth embodiment of this invention.

FIG. 13 shows an encoding apparatus according to the sixth embodiment of this invention. As shown in FIG. 13, the encoding apparatus includes a 4:1:1/4:2:0 format converter 41 and a 4:1:1/4:2:0 pixel displacement converter 42 for color difference signals. A user interface 43 is connected to a switch 44 which follows the 4:1:1/4:2:0 format converter 41 and the 4:1:1/4:2:0 pixel displacement converter 42.

The switch 44 is connected to an MPEG encoder 45. The MPEG encoder 45 is connected to a buffer memory and formatter 46. A sync controller 47 is connected to a sync signal generator 48. The sync signal generator 48 is connected to the user interface 43 and the buffer memory and formatter 46. An identification (ID) code generator 49 is connected to the buffer memory and formatter 46 and the sync signal generator 48. The buffer memory and formatter 46 is connected to a data recording section 50.

The encoding apparatus of FIG. 13 operates as follows. A 4:1:1 digital picture signal is inputted into the 4:1:1/4:2:0 format converter 41 and the 4:1:1/4:2:0 pixel displacement converter 42. The 4:1:1/4:2:0 format converter 41 oversamples a digital color difference signal in the input 4:1:1 digital picture signal along a horizontal direction to double the number of pixels (signal samples) for every scanning line. The 4:1:1/4:2:0 format converter 41 filters the digital color difference signal in the input 4:1:1 digital picture signal along a vertical direction to halve its frequency band, and then halves the number of signal samples in the vertical direction. On the other hand, the 4:1:1/4:2:0 format converter 41 does not process a digital luminance signal in the input 4:1:1 digital picture signal. Accordingly, the 4:1:1/4:2:0 format converter 41 changes the input 4:1:1 digital picture signal into a 4:2:0 signal format. The 4:2:0 digital picture signal generated by the 4:1:1/4:2:0 format converter 41 is equal in frequency band to a 4:1:0 digital picture signal. The 4:1:1/4:2:0 format converter 41 outputs the resultant 4:2:0 digital picture signal to the switch 44.

The 4:1:1/4:2:0 pixel displacement converter 42 subjects the input 4:1:1 digital picture signal to a color-signal pixel displacement process which corresponds to one of the previously-mentioned first to fourth displacement methods in FIGS. 9–12. Specifically, the 4:1:1/4:2:0 pixel displacement converter 42 includes a memory, an address controller, a first section for writing a signal into the memory while being controlled by the address controller, and a second section for reading a signal from the memory while being controlled by the address controller. In addition, the 4:1:1/4:2:0 pixel displacement converter 42 includes a circuit for separating digital color difference signals from the input 4:1:1 digital picture signal, that is, a circuit for dividing the input 4:1:1 digital picture signal into a digital luminance signal and digital color difference signals. Furthermore, the 4:1:1/4:2:0 pixel displacement converter 42 includes a circuit for combining a digital luminance signal and digital color difference signals.

In the 4:1:1/4:2:0 pixel displacement converter 42, samples of each color difference signal are sequentially written into the memory while being controlled by the address controller. Samples of the color difference signal are read out from the memory in an address sequence while being controlled by the address controller. The address sequence is determined by the displacement method so that color-difference-signal pixel displacements are implemented according to the displacement method. Subsequently, the after-displacement digital color difference signal is written into the memory while being controlled by the address controller. Then, the after-displacement digital color difference signal is read out from the memory while being controlled by the address controller. The read-out digital color difference signal and the digital luminance signal are combined into a 4:2:0 digital picture signal. The 4:1:1/4:2:0 pixel displacement converter 42 outputs the resultant 4:2:0 digital picture signal to the switch 44.

A user can decide which of the output signal from the 4:1:1/4:2:0 format converter 41 and the output signal from the 4:1:1/4:2:0 pixel displacement converter 42 should be selected. The user interface 43 generates a switching signal in accordance with user's decision. The user interface 43 outputs the switching signal to the switch 44. The switch 44 selects one of the output signal from the 4:1:1/4:2:0 format converter 41 and the output signal from the 4:1:1/4:2:0 pixel displacement converter 42 in response to the switching signal. The switch 44 outputs the selected 4:2:0 digital picture signal to the MPEG encoder 45.

The MPEG encoder 45 has a conventional structure. The MPEG encoder 45 subjects the 4:2:0 digital picture signal to a compressively encoding process which conforms to the MPEG standards. Thereby, the MPEG encoder 45 converts the 4:2:0 digital picture signal into an MPEG bit stream. The MPEG encoder 45 feeds the MPEG bit stream to the buffer memory and formatter 46.

The sync controller 47 includes a timer repetitively measuring a predetermined time interval. The sync controller 47 outputs a trigger signal to the sync signal generator 48 for every predetermined time interval. The predetermined time interval is equal to, for example, 1/29.97 second, that is, a 1-frame time interval related to an NTSC picture signal. In response to every trigger signal, the sync signal generator 48 produces a sync signal of a uniquely-identifiable fixed pattern which represents the presence of an ID code being a feature of the present embodiment of this invention. According to the first MPEG syntax, a given area, for example, a user_data area, is set as an area which can be loaded with data unrelated to video and audio information. The sync signal of the fixed pattern is placed in the given area.

The video stream picture layer of MPEG1 is defined as shown in FIG. 14. In a range prior to the slice layer, after the user data start code (user_data_start_code) is transmitted, user data (user_data) can be transmitted 8-bit by 8-bit (see FIG. 14). The sync signal and the ID code may be contained in the user data.

The transport stream system layer of MPEG2 is defined as shown in FIG. 15. when the transport private data flag (transport_private_data_flag) is set to "1", the presence of private data (private_data) is indicated. The private data can be transmitted. The sync signal and the Id code may be contained in the private data. The length of the private data is set by the transport private data length (transport_private_data_length) while being limited so as not to overflow the related transport packet.

According to another method of transmitting user's own data in an MPEG system, a private stream (private_stream) is set in the stream id (stream_id), and the provision of an exclusive packet is declared. The sync signal and the ID code may be contained in the private stream.

The sync signal and the ID code can be multiplexed with encoded picture data, and be transmitted in at least one of the above-mentioned three ways.

In the case where user data (user_data) of MPEG 1 video are used, a user data start code (user_data_start_code) in a region prior to the slice layer is defined as "0x000001B2". After the user data start code is transmitted, a uniquely-identifiable sync signal representative of the presence of an ID code is transmitted during a time interval corresponding to a user data area. The sync signal is set to a value of, for example, "0x0f0f0f0f2428fdaa" which is chosen separately from the MPEG standards. The sync signal enables a decoding side to detect the position of the ID code in the transmitted signal. The sync signal generator 48 observes the MPEG bit stream inputted into the buffer memory and formatter 46 from the MPEG encoder 45, and detects a given user data (user_data) area in the MPEG bit stream. Thereafter, the sync signal generator 48 produces a desired user data start code (user_data_start_code) to declare the setting of a user data (user_data) area. Subsequently, the sync signal generator 48 produces the previously-mentioned sync signal. The sync signal generator 48 outputs the produced sync signal to the buffer memory and formatter 46.

The sync signal generator 48 outputs a signal to the ID code generator 49 which represents the generation of the sync signal. The ID code generator 49 produces an ID code at a timing after the generation of the sync signal. The ID code generator 49 outputs the produced ID code to the buffer memory and deformatter 46. The ID code has a value which represents whether the digital picture signal inputted into the buffer memory and deformatter 46 originates from the output signal of the 4:1:1/4:2:0 format converter 41 or the output signal of the 4:1:1/4:2:0 pixel displacement converter 42.

The ID code generator 49 receives the switching signal from the user interface 43 via the sync signal generator 48. The ID code generator 49 sets the value of the ID code in response to the switching signal. The ID code has, for example, one byte. For example, the ID code being "0x01" indicates that the digital picture signal inputted into the buffer memory and deformatter 46 originates from the output signal of the 4:1:1/4:2:0 pixel displacement converter 42. On the other hand, the ID code being "0x00" indicates that the digital picture signal inputted into the buffer memory and deformatter 46 originates from the output signal of the 4:1:1/4:2:0 format converter 41.

The buffer memory and formatter 46 combines the output signal of the MPEG encoder 45, the sync signal, and the ID code into a multiplexed digital signal having data placement accorded with the format of a recording medium 51. The buffer memory and formatter 46 outputs the multiplexed digital signal to the data recording section 50. The data recording section 50 records the multiplexed digital signal on the recording medium 51. Examples of the recording medium 51 are a magnetic tape, an optical disc, and a magnetic disc.

It should be noted that the ID code may contain information representing which of the previously-mentioned first to fourth displacement methods in FIGS. 9–12 the 4:1:1/4:2:0 pixel displacement converter 42 uses.

Seventh Embodiment

Figure 16:
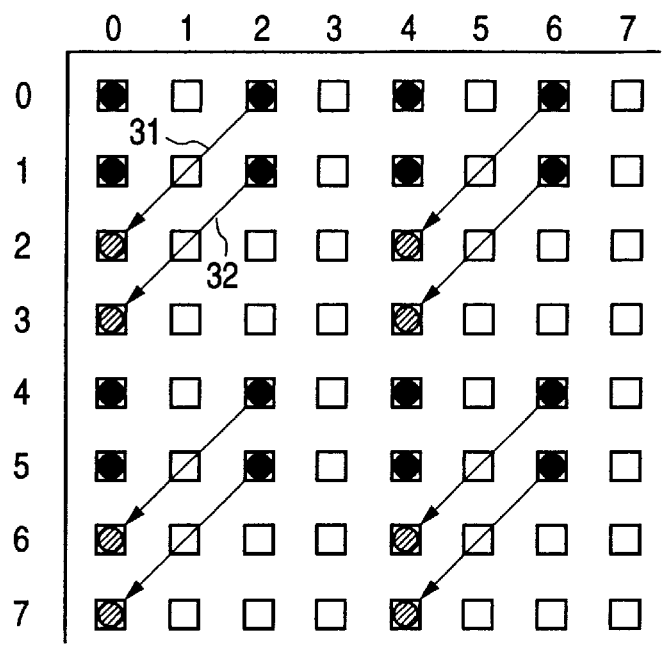
FIG. 16 is a diagram of sample points (pixel points) of digital luminance and color difference signals, and shifts of color-difference-signal pixel points in a first pixel displacement method according to a seventh embodiment of this invention.

FIG. 16 relates to a first method of displacing color-difference-signal pixel positions (sample points) in every field picture to convert a 4:2:0 digital picture signal into a 4:1:1 digital picture signal. FIG. 16 shows pixel positions on a portion of a frame represented by a 4:2:0 digital picture signal. In FIG. 16, the white squares denote respective pixel positions (sample points) of a digital luminance signal in the 4:2:0 digital picture signal, and the black circles denote respective pixel positions (sample points) of a digital color difference signal in the 4:2:0 digital picture signal. In addition, the gray circles denote respective after-displacement pixel positions (sample points) of the digital color difference signal which are located in pixel positions where only pixels of the digital luminance signal exist under the original conditions. Here, the digital color difference signal means each of a digital Cr signal and a digital Cb signal. The first displacement method processes the digital Cr signal and the digital Cb signal in similar ways.

Every frame represented by the 4:2:0 digital picture signal is composed of 360 samples by 480 lines (or 720 samples by 480 lines). FIG. 16 shows only a 8-pixel-by-8-line portion of a frame represented by the 4:2:0 digital picture signal. For every line, serial order numbers from "0" to "359" (or "0" to "719") are assigned to 360 samples (or 720 samples) respectively along the rightward direction. For every frame, serial order numbers from "0" to "479" are assigned to 480 lines along the downward direction.

In the first displacement method, some of pixel positions (sample points) of a digital color difference signal, that is, each of a digital Cr signal and a digital Cb signal, are shifted in the signal processing world as follows. The position of every pixel relative to a frame is expressed by the order number of the pixel and the order number of the line on which the pixel extends. Under the original conditions, pixels (samples) of the color difference signal exist only at positions determined by given pixel order numbers and given line order numbers. The given pixel order numbers are equal to multiples of 2, that is, 0, 2, 4, . . . . The given line order numbers are equal to integers exactly divisible by 4, and also integers correspond to remainders of 1 if they are divided by 4. Specifically, the given line order numbers are equal to 0, 1, 4, 5, . . . .

For a first field, first selected pixels (samples) of the digital color difference signal are shifted leftward by a distance corresponding to two pixels, and are shifted downward by a distance corresponding to two lines. The first selected pixels are at positions determined by first prescribed pixel order numbers and first prescribed line order numbers. The first prescribed pixel order numbers are equal to integers which correspond to remainders of 2 if they are divided by 4. Specifically, the first prescribed pixel order numbers are equal to 2, 6, 10, 14, . . . . The first prescribed line order numbers are equal to integers which are exactly divisible by 4. Specifically, the first prescribed line order numbers are equal to 0, 4, 8, 12, . . . . For a second field, second selected pixels (samples) of the digital color difference signal are shifted leftward by a distance corresponding to two pixels, and are shifted downward by a distance corresponding to two lines. The second selected pixels are at positions determined by second prescribed pixel order numbers and second prescribed line order numbers. The second prescribed pixel order numbers are equal to integers which correspond to remainders of 2 if they are divided by 4. Specifically, the second prescribed pixel order numbers are equal to 2, 6, 10, 14, . . . . The second prescribed line order numbers are equal to integers which correspond to remainders of 1 if they are divided by 4. Specifically, the second prescribed line order numbers are equal to 1, 5, 9, 13, . . . .

Examples of pixel shifts will be indicated hereinafter. With reference to FIG. 16, as denoted by the arrow 31, the pixel of the color difference signal at a position determined by the pixel order number "2" and the line order number "0" is shifted to a position determined by the pixel order number "0" and the line order number "2" for the first field. As denoted by the arrow 32, the pixel of the color difference signal at a position determined by the pixel order number "2" and the line order number "1" is shifted to a position determined by the pixel order number "0" and the line order number "3" for the second field.

As a result of the pixel shifts in the first displacement method, the total number of pixels (samples) of the color difference signal per every specified line is halved while the total number of lines in every field or every frame on which color-difference-signal pixels (samples) exist is doubled. Thus, the pixel shifts in the first displacement method rearranges color-difference-signal pixels into a configuration accorded with the 4:1:1 signal format. The first displacement method (the displacement method in FIG. 16) is inverse with respect to the displacement method in FIG. 9.

Figure 17:
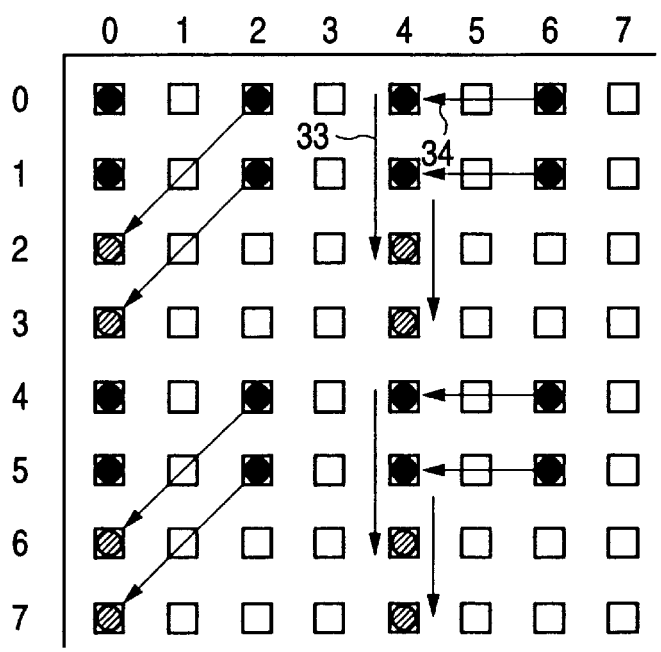
FIG. 17 is a diagram of sample points (pixel points) of digital luminance and color difference signals, and shifts of color-difference-signal pixel points in a second pixel displacement method according to the seventh embodiment of this invention.

FIG. 17 similar to FIG. 16 relates to a second method of displacing color-difference-signal pixel positions (sample points) in every field picture to convert a 4:2:0 digital picture signal into a 4:1:1 digital picture signal. In the second displacement method, some of pixel positions (sample points) of a digital color difference signal, that is, each of a digital Cr signal and a digital Cb signal, are shifted in the signal processing world as follows. The position of every pixel relative to a frame is expressed by the order number of the pixel and the order number of the line on which the pixel extends. The second displacement method processes the digital Cr signal and the digital Cb signal in similar ways.

According to the second displacement method, for a first field, first selected pixels (samples) of the digital color difference signal are shifted leftward by a distance corresponding to two pixels, and are shifted downward by a distance corresponding to two lines. The first selected pixels are at positions determined by first prescribed pixel order numbers and first prescribed line order numbers. The first prescribed pixel order numbers are equal to integers which correspond to remainders of 2 if they are divided by 8. Specifically, the first prescribed pixel order numbers are equal to 2, 10, 18, . . . . The first prescribed line order numbers are equal to integers which are exactly divisible by 4. Specifically, the first prescribed line order numbers are equal to 0, 4, 8, 12, . . . . For the first field, second selected pixels (samples) of the digital color difference signal are shifted downward by a distance corresponding to two lines. The second selected pixels are at positions determined by second prescribed pixel order numbers and second prescribed line order numbers. The second prescribed pixel order numbers are equal to integers which correspond to remainders of 4 if they are divided by 8. Specifically, the second prescribed pixel order numbers are equal to 4, 12, 20, . . . . The second prescribed line order numbers are equal to integers which are exactly divisible by 4. Specifically, the second prescribed line order numbers are equal to 0, 4, 8, 12, . . . . Subsequently, third selected pixels are shifted as follows. For the first field, third selected pixels (samples) of the digital color difference signal are shifted leftward by a distance corresponding to two pixels. The third selected pixels are at positions determined by third prescribed pixel order numbers and third prescribed line order numbers. The third prescribed pixel order numbers are equal to integers which correspond to remainders of 6 if they are divided by 8. Specifically, the third prescribed pixel order numbers are equal to 6, 14, 22, . . . . The third prescribed line order numbers are equal to integers which are exactly divisible by 4. Specifically, the third prescribed line order numbers are equal to 0, 4, 8, 12, . . . .

According to the second displacement method, for a second field, fourth selected pixels (samples) of the digital color difference signal are shifted leftward by a distance corresponding to two pixels, and are shifted downward by a distance corresponding to two lines. The fourth selected pixels are at positions determined by fourth prescribed pixel order numbers and fourth prescribed line order numbers. The fourth prescribed pixel order numbers are equal to integers which correspond to remainders of 2 if they are divided by 8. Specifically, the fourth prescribed pixel order numbers are equal to 2, 10, 18, . . . . The fourth prescribed line order numbers are equal to integers which correspond to remainders of 1 if they are divided by 4. Specifically, the fourth prescribed line order numbers are equal to 1, 5, 9, 13, . . . . For the second field, fifth selected pixels (samples) of the digital color difference signal are shifted downward by a distance corresponding to two lines. The fifth selected pixels are at positions determined by fifth prescribed pixel order numbers and fifth prescribed line order numbers. The fifth prescribed pixel order numbers are equal to integers which correspond to remainders of 4 if they are divided by 8. Specifically, the fifth prescribed pixel order numbers are equal to 4, 12, 20, . . . . The fifth prescribed line order numbers are equal to integers which correspond to remainders of 1 if they are divided by 4. Specifically, the fifth prescribed line order numbers are equal to 1, 5, 9, 13, . . . . Subsequently, sixth selected pixels are shifted as follows. For the second field, sixth selected pixels (samples) of the digital color difference signal are shifted leftward by a distance corresponding to two pixels. The sixth selected pixels are at positions determined by sixth prescribed pixel order numbers and sixth prescribed line order numbers. The sixth prescribed pixel order numbers are equal to integers which correspond to remainders of 6 if they are divided by 8. Specifically, the sixth prescribed pixel order numbers are equal to 6, 14, 22, . . . . The sixth prescribed line order numbers are equal to integers which correspond to remainders of 1 if they are divided by 4. Specifically, the sixth prescribed line order numbers are equal to 1, 5, 9, 13, . . . .

Examples of pixel shifts will be indicated hereinafter. With reference to FIG. 17, as denoted by the arrow 33, the pixel of the color difference signal at a position determined by the pixel order number "4" and the line order number "0" is shifted to a position determined by the pixel order number "4" and the line order number "2" for the first field. Subsequently, as denoted by the arrow 34, the pixel of the color difference signal at a position determined by the pixel order number "6" and the line order number "0" is shifted to the position determined by the pixel order number "4" and the line order number "0" for the first field.

As a result of the pixel shifts in the second displacement method, the total number of pixels (samples) of the color difference signal per every specified line is halved while the total number of lines in every field or every frame on which color-difference-signal pixels (samples) exist is doubled. Thus, the pixel shifts in the a second displacement method rearranges color-difference-signal pixels into a configuration accorded with the 4:1:1 signal format. The second displacement method (the displacement method in FIG. 17) is inverse with respect to the displacement method in FIG. 10.

Figure 18:
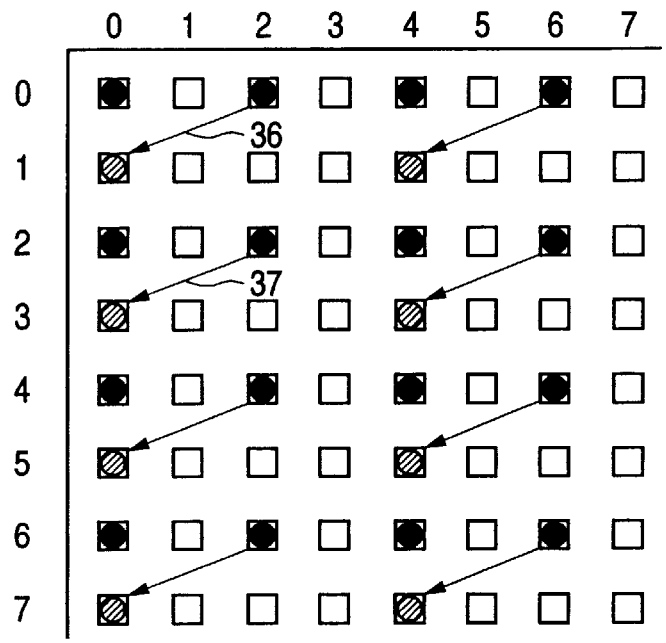
FIG. 18 is a diagram of sample points (pixel points) of digital luminance and color difference signals, and shifts of color-difference-signal pixel points in a third pixel displacement method according to the seventh embodiment of this invention.

FIG. 18 relates to a third method of displacing color-difference-signal pixel positions (sample points) in every frame picture to convert a 4:2:0 digital picture signal into a 4:1:1 digital picture signal. FIG. 18 shows pixel positions on a portion of a frame represented by a 4:2:0 digital picture signal. In FIG. 18, the white squares denote respective pixel positions (sample points) of a digital luminance signal in the 4:2:0 digital picture signal, and the black circles denote respective pixel positions (sample points) of a digital color difference signal in the 4:2:0 digital picture signal. In addition, the gray circles denote respective after-displacement pixel positions (sample points) of the digital color difference signal which are located in pixel positions where only pixels of the digital luminance signal exist under the original conditions. Here, the digital color difference signal means each of a digital Cr signal and a digital Cb signal. The third displacement method processes the digital Cr signal and the digital Cb signal in similar ways.

Every frame represented by the 4:2:0 digital picture signal is composed of 360 samples by 480 lines (or 720 samples by 480 lines). FIG. 18 shows only a 8-pixel-by-8-line portion of a frame represented by the 4:2:0 digital picture signal. For every line, serial order numbers from "0" to "359" (or "0" to "719") are assigned to 360 samples (or 720 samples) respectively along the rightward direction. For every frame, serial order numbers from "0" to "479" are assigned to 480 lines along the downward direction.

In the third displacement method, some of pixel positions (sample points) of a digital color difference signal, that is, each of a digital Cr signal and a digital Cb signal, are shifted in the signal processing world as follows. The position of every pixel relative to a frame is expressed by the order number of the pixel and the order number of the line on which the pixel extends. For every frame, selected pixels (samples) of the digital color difference signal are shifted leftward by a distance corresponding to two pixels, and are shifted downward by a distance corresponding to one line. The selected pixels are at positions determined by first prescribed pixel order numbers and first prescribed line order numbers. The first prescribed pixel order numbers are equal to integers which correspond to remainders of 2 if they are divided by 4. Specifically, the first prescribed pixel order numbers are equal to 2, 6, 10, 14, . . . . The first prescribed line order numbers are equal to integers which are exactly divisible by 2. Specifically, the first prescribed line order numbers are equal to 0, 2, 4, 6, . . . .

Examples of pixel shifts will be indicated hereinafter. With reference to FIG. 18, as denoted by the arrow 36, the pixel of the color difference signal at a position determined by the pixel order number "2" and the line order number "0" is shifted to a position determined by the pixel order number "0" and the line order number "1". As denoted by the arrow 37, the pixel of the color difference signal at a position determined by the pixel order number "2" and the line order number "2" is shifted to a position determined by the pixel order number "0" and the line order number "3".

As a result of the pixel shifts in the third displacement method, the total number of pixels (samples) of the color difference signal per every specified line is halved while the total number of lines in every frame on which color-difference-signal pixels (samples) exist is doubled. Thus, the pixel shifts in the third example of the displacement method rearranges color-difference-signal pixels into a configuration accorded with the 4:1:1 signal format. The third displacement method (the displacement method in FIG. 18) is inverse with respect to the displacement method in FIG. 11.

Figure 19:
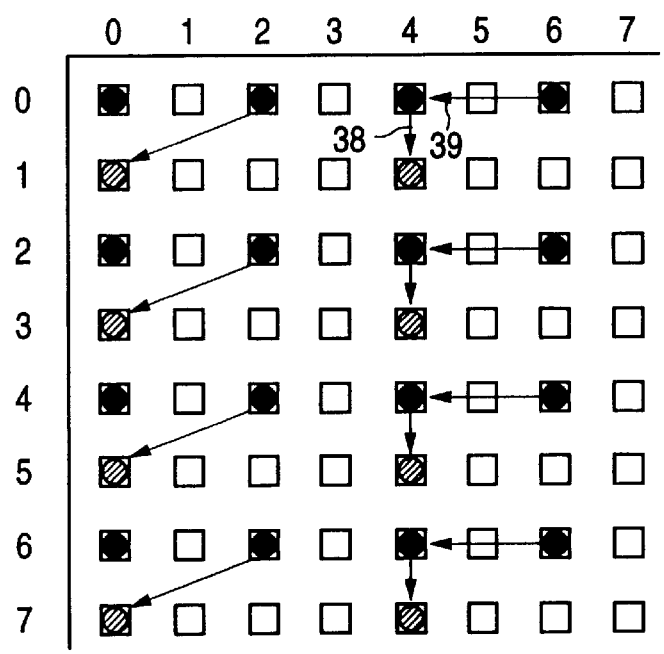
FIG. 19 is a diagram of sample points (pixel points) of digital luminance and color difference signals, and shifts of color-difference-signal pixel points in a fourth pixel displacement method according to the seventh embodiment of this invention.

FIG. 19 similar to FIG. 18 relates to a fourth method of displacing color-difference-signal pixel positions (sample points) in every frame picture to convert a 4:2:0 digital picture signal into a 4:1:1 digital picture signal. In the fourth displacement method, some of pixel positions (sample points) of a digital color difference signal, that is, each of a digital Cr signal and a digital Cb signal, are shifted in the signal processing world as follows. The position of every pixel relative to a frame is expressed by the order number of the pixel and the order number of the line on which the pixel extends. The fourth displacement method processes the digital Cr signal and the digital Cb signal in similar ways.

According to the fourth displacement method, for every frame, first selected pixels (samples) of the digital color difference signal are shifted leftward by a distance corresponding to two pixels, and are shifted downward by a distance corresponding to one line. The first selected pixels are at positions determined by first prescribed pixel order numbers and first prescribed line order numbers. The first prescribed pixel order numbers are equal to integers which correspond to remainders of 2 if they are divided by 8. Specifically, the first prescribed pixel order numbers are equal to 2, 10, 18, . . . . The first prescribed line order numbers are equal to integers which are exactly divisible by 2. Specifically, the first prescribed line order numbers are equal to 0, 2, 4, 6, . . . . For every frame, second selected pixels (samples) of the digital color difference signal are shifted downward by a distance corresponding to one line. The second selected pixels are at positions determined by second prescribed pixel order numbers and second prescribed line order numbers. The second prescribed pixel order numbers are equal to integers which correspond to remainders of 4 if they are divided by 8. Specifically, the second prescribed pixel order numbers are equal to 4, 12, 20, . . . . The second prescribed line order numbers are equal to integers which are exactly divisible by 2. Specifically, the second prescribed line order numbers are equal to 0, 2, 4, 6, . . . . Subsequently, third selected pixels (samples) of the digital color difference signal are shifted leftward by a distance corresponding to two pixels. The third selected pixels are at positions determined by third prescribed pixel order numbers and third prescribed line order numbers. The third prescribed pixel order numbers are equal to integers which correspond to remainders of 6 if they are divided by 8. Specifically, the third prescribed pixel order numbers are equal to 6, 14, 22, . . . . The third prescribed line order numbers are equal to integers which are exactly divisible by 2. Specifically, the third prescribed line order numbers are equal to 0, 2, 4, 6, . . . .

Examples of pixel shifts will be indicated hereinafter. With reference to FIG. 19, as denoted by the arrow 38, the pixel of the color difference signal at a position determined by the pixel order number "4" and the line order number "0" is shifted to a position determined by the pixel order number "4" and the line order number "1". Subsequently, as denoted by the arrow 39, the pixel of the color difference signal at a position determined by the pixel order number "6" and the line order number "0" is shifted to the position determined by the pixel order number "4" and the line order number "0".

As a result of the pixel shifts in the fourth displacement method, the total number of pixels (samples) of the color difference signal per every specified line is halved while the total number of lines in every frame on which color-difference-signal pixels (samples) exist is doubled. Thus, the pixel shifts in the fourth displacement method rearranges color-difference-signal pixels into a configuration accorded with the 4:1:1 signal format. The fourth displacement method (the displacement method in FIG. 19) is inverse with respect to the displacement method in FIG. 12.

Figure 20:
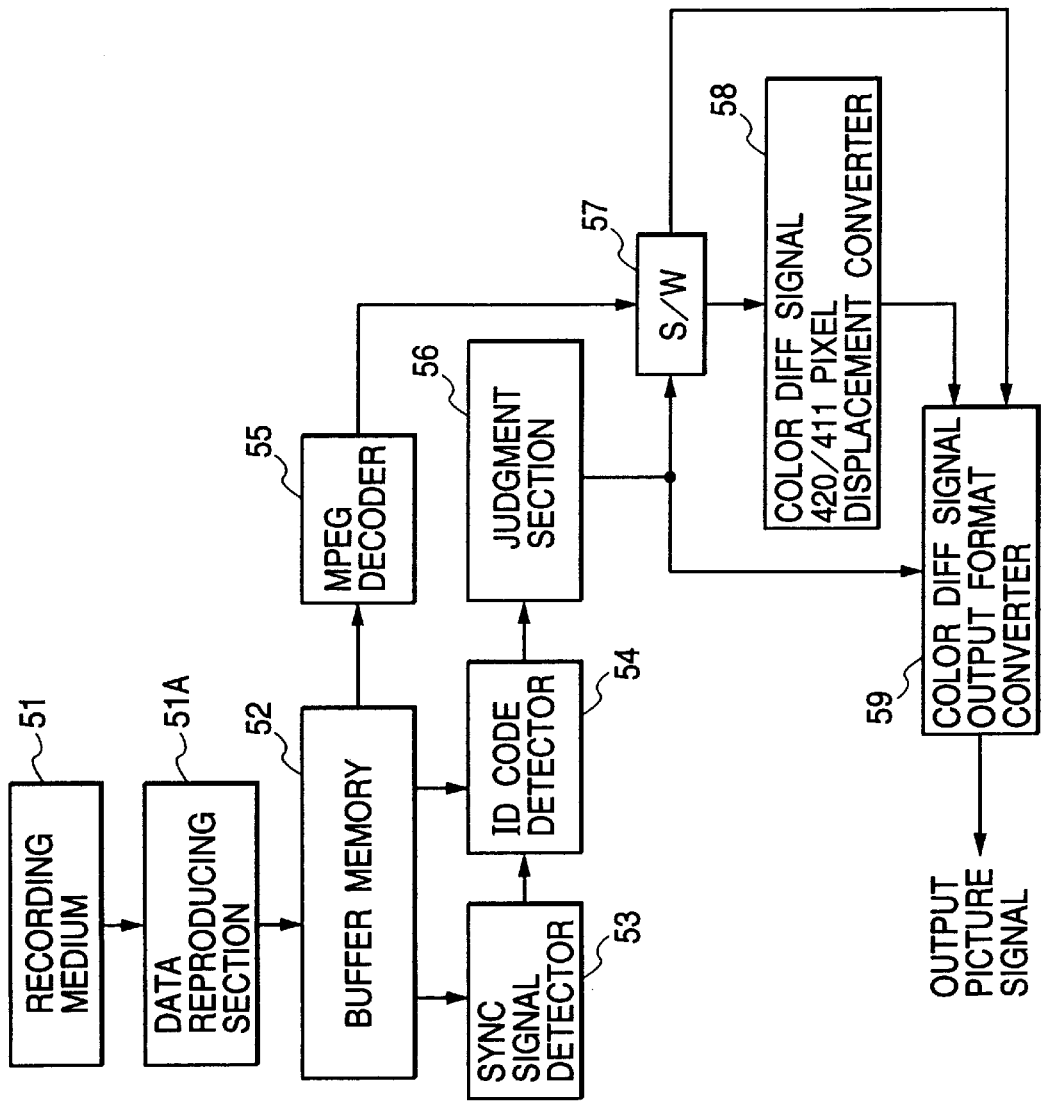
FIG. 20 is a block diagram of a decoding apparatus according to the seventh embodiment of this invention.

FIG. 20 shows a decoding apparatus according to the seventh embodiment of this invention. As shown in FIG. 20, the decoding apparatus includes a data reproducing section 51A followed by a buffer memory 52. The buffer memory 52 is connected to a sync signal detector 53, an ID code detector 54, and an MPEG decoder 55.

The sync signal detector 53 is connected to the ID code detector 54. The ID code detector 54 is connected to a judgment section 56. The judgment section 56 is connected to a switch 57. The MPEG decoder 55 is connected to the switch 57. The switch 57 is connected to a 4:2:0/4:1:1 pixel displacement converter 58 and a format converter 59 for color difference signals. The judgment section 56 and the 4:2:0/4:1:1 pixel displacement converter 58 are connected to the format converter 59.

The decoding apparatus of FIG. 20 operates as follows. The data reproducing section 51A reproduces a digital picture signal from a recording medium 51. The digital picture signal on the recording medium 51 may be a digital picture signal recorded by the encoding apparatus of FIG. 13. The reproduced digital picture signal (the reproduced MPEG bit stream) is temporarily stored in the buffer memory 52 before being fed to the sync signal detector 53, the ID code detector 54, and the MPEG decoder 55.

The sync signal detector 53 observes the MPEG bit stream (that is, the reproduced digital picture signal or the output signal from the buffer memory 52), and detects a user_data area and a user_data_start_code therein. After the sync signal detector 53 confirms that the detected user_data area is a correct one, the device 53 detects a sync signal of a fixed pattern in the MPEG bit stream. Upon the detection of the sync signal of the fixed pattern, the sync signal detector 53 outputs a trigger signal to the ID code detector 54.

The ID code detector 54 accesses, in response to the trigger signal (or the sync signal of the fixed pattern), a position in the MPEG bit stream in which an ID code exists. Then, the device 54 detects the ID code. The ID code detector 54 transmits the detected ID code to the judgment section 56. The judgment section 56 decides whether the reproduced digital picture signal originates from the output signal of a 4:1:1/4:2:0 format converter 41 or the output signal of a 4:1:1/4:2:0 pixel displacement converter 42 in an encoding apparatus (see FIG. 13) by referring to the ID code. The judgment section 56 controls the switch 57 in response to the result of the decision. In addition, the judgment section 56 informs the format converter 59 of the decision result.

The MPEG decoder 55 has a conventional structure. The MPEG decoder 55 subjects the reproduced digital picture signal to a decoding process which conforms to the MPEG standards. Thereby, the MPEG decoder 55 converts the reproduced digital picture signal into a 4:2:0 digital picture signal. The decoding process by the MPEG decoder 55 is inverse with respect to the encoding process by an MPEG encoder 45 in the encoding apparatus (see FIG. 13). The MPEG decoder 55 outputs the 4:2:0 digital picture signal to the switch 57.

In the case where it is decided that the reproduced digital picture signal originates from the output signal of the 4:1:1/4:2:0 pixel displacement converter 42 in the encoding apparatus, the judgment section 56 controls the switch 57 so that the output signal from the MPEG decoder 55 will be fed to the 4:2:0/4:1:1 pixel displacement converter 58. In the case where it is decided that the reproduced digital picture signal originates from the output signal of the 4:1:1/4:2:0 format converter 41 in the encoding apparatus, the judgment section 56 controls the switch 57 so that the output signal from the MPEG decoder 55 will be fed to the format converter 59.

The 4:2:0/4:1:1 pixel displacement converter 58 subjects the 4:2:0 digital picture signal (the output signal of the MPEG decoder 55) to a color-signal pixel displacement process which corresponds to one of the previously-mentioned first to fourth displacement methods in FIGS. 16–19. The displacement method used by the 4:2:0/4:1:1 pixel displacement converter 58 corresponds to the displacement method used by the 4:1:1/4:2:0 pixel displacement converter 42 in the encoding apparatus. Specifically, the displacement method of FIG. 16 is used when the displacement method of FIG. 9 is used in the encoding apparatus. The displacement method of FIG. 17 is used when the displacement method of FIG. 10 is used in the encoding apparatus. The displacement method of FIG. 18 is used when the displacement method of FIG. 11 is used in the encoding apparatus. The displacement method of FIG. 19 is used when the displacement method of FIG. 12 is used in the encoding apparatus.

The 4:2:0/4:1:1 pixel displacement converter 58 includes a memory, an address controller, a first section for writing a signal into the memory while being controlled by the address controller, and a second section for reading a signal from the memory while being controlled by the address controller. In addition, the 4:2:0/4:1:1 pixel displacement converter 58 includes a circuit for separating digital color difference signals from the 4:2:0 digital picture signal, that is, a circuit for dividing the 4:2:0 digital picture signal into a digital luminance signal and digital color difference signals. Furthermore, the 4:2:0/4:1:1 pixel displacement converter 58 includes a circuit for combining a digital luminance signal and digital color difference signals.

In the 4:2:0/4:1:1 pixel displacement converter 58, samples of each color difference signal are sequentially written into the memory while being controlled by the address controller. Samples of the color difference signal are read out from the memory in an address sequence while being controlled by the address controller. The address sequence is determined by the displacement method so that color-difference-signal pixel displacements are implemented according to the displacement method. Subsequently, the after-displacement digital color difference signal is written into the memory while being controlled by the address controller. Then, the after-displacement digital color difference signal is read out from the memory while being controlled by the address controller. The read-out digital color difference signal and the digital luminance signal are combined into a 4:1:1 digital picture signal. The 4:2:0/4:1:1 pixel displacement converter 58 outputs the resultant 4:1:1 digital picture signal to the format converter 59.

The format converter 59 responds to the result of the decision by the judgment section 56 as follows. In the case where it is decided that the reproduced digital picture signal originates from the output signal of the 4:1:1/4:2:0 pixel displacement converter 42 in the encoding apparatus, the format converter 59 over-samples each of the color difference signals in the output 4:1:1 digital picture signal from the 4:2:0/4:1:1 pixel displacement converter 58 along a horizontal direction at a double rate to convert the 4:1:1 digital picture signal into a 4:2:2 digital picture signal. The format converter 59 outputs the resultant 4:2:2 digital picture signal. In this case, the format converter 59 may transmit the 4:1:1 digital picture signal as it is. On the other hand, in the case where it is decided that the reproduced digital picture signal originates from the output signal of the 4:1:1/4:2:0 format converter 41 in the encoding apparatus, the format converter 59 over-samples each of the color difference signals in the output 4:2:0 digital picture signal from the MPEG decoder 55 along a vertical direction at a double rate to convert the 4:2:0 digital picture signal into a 4:2:2 digital picture signal. The format converter 59 outputs the resultant 4:2:2 digital picture signal. In this case, the format converter 59 may further convert the 4:2:2 digital picture signal into a 4:1:1 digital picture signal by a color-sample decimating process before outputting the resultant 4:1:1 digital picture signal.

Eighth Embodiment

Figure 21:
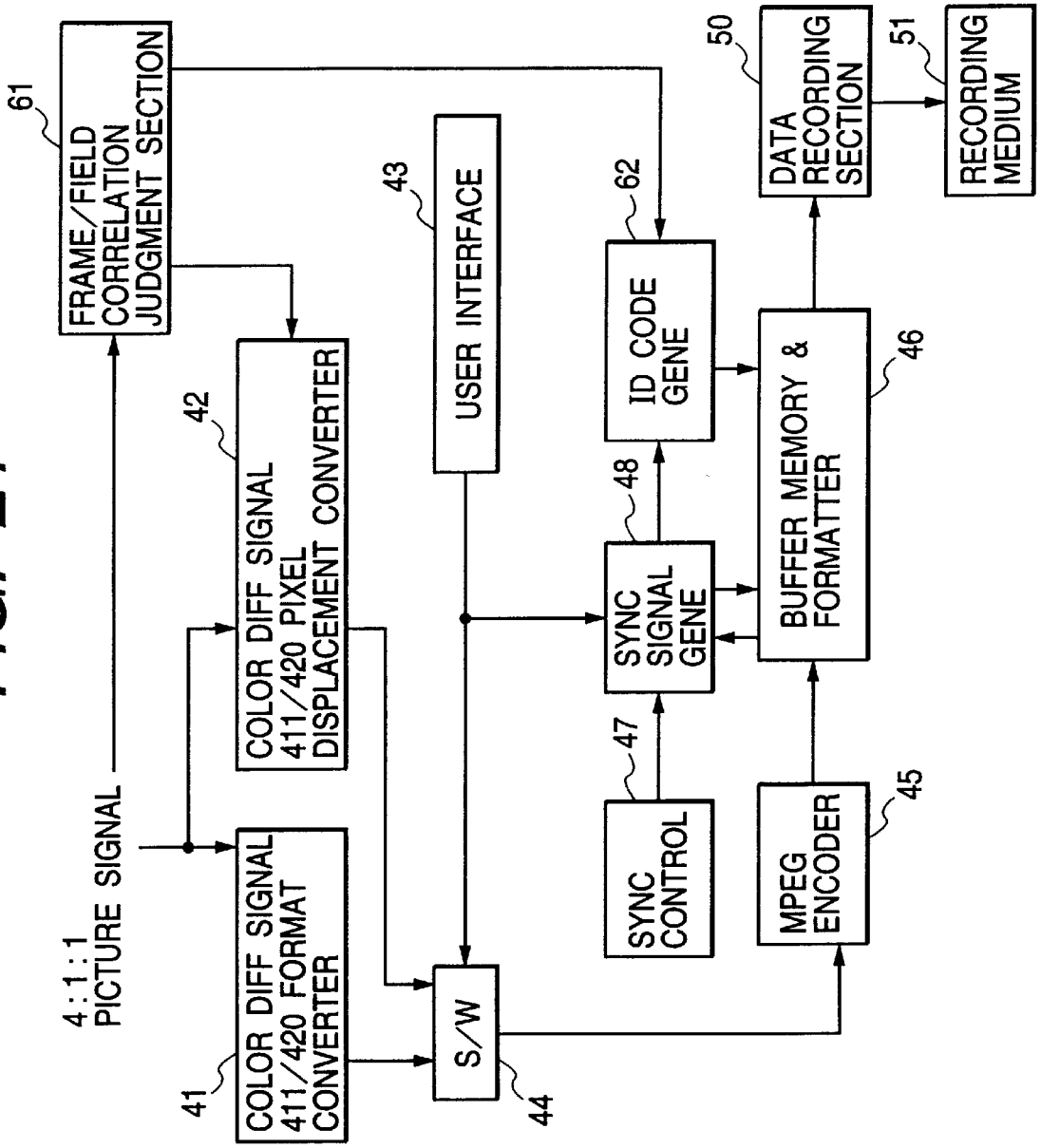
FIG. 21 is a block diagram of an encoding apparatus according to an eighth embodiment of this invention.

FIG. 21 shows an encoding apparatus according to an eighth embodiment of this invention. The encoding apparatus of FIG. 21 is similar to the encoding apparatus of FIG. 13 except for design changes mentioned hereinafter. The encoding apparatus of FIG. 21 includes a frame/field correlation judgment section 61. The encoding apparatus of FIG. 21 includes an ID code generator 62 instead of the ID code generator 49 (see FIG. 13). The frame/field judgment section 61 receives an input 4:1:1 digital picture signal. The frame/field judgment section 61 is connected to a 4:1:1/4:2:0 pixel displacement converter 42 and the ID code generator 62.

The frame/field correlation judgment section 61 detects the degree of a correlation in every frame represented by the input 4:1:1 digital picture signal, and also the degree of a correlation in every field represented by the input 4:1:1 digital picture signal. The frame/field correlation judgment section 61 decides which of the frame correlation and the field correlation is greater. The frame/field correlation judgment section 61 informs the 4:1:1/4:2:0 pixel displacement converter 42 and the ID code generator 62 of the decision result.

In the case where it is decided that the field correlation is greater than the frame correlation, the 4:1:1/4:2:0 pixel displacement converter 42 selects one of the displacement methods (the intra-field pixel displacement methods) in FIGS. 9 and 10. On the other hand, in the case where it is decided that the frame correlation is greater than the field correlation, the 4:1:1/4:2:0 pixel displacement converter 42 selects one of the displacement methods (the intra-frame pixel displacement methods) in FIGS. 11 and 12. The 4:1:1/4:2:0 pixel displacement converter 42 implements the conversion of the input 4:1:1 digital picture signal into a 4:2:0 digital picture signal according to the selected displacement method.

The ID code generator 62 assigns a specified bit of an ID code to an indication of whether the 4:1:1/4:2:0 pixel displacement converter 42 implements an intra-field pixel displacement method or an intra-frame pixel displacement method. The ID code generator 62 sets the logic state of the specified bit of the ID code in response to the result of the decision by the frame/field correlation judgment section 61. Accordingly, information representing whether the 4:1:1/4:2:0 pixel displacement converter 42 implements an intra-field pixel displacement method or an intra-frame pixel displacement method is multiplexed with an MPEG bit stream.

Specifically, for a specified area in every frame, the frame/field judgment section 61 calculates the first inter-pixel differences between portions of the input 4:1:1 digital picture signal which represent two successive lines. Then, the frame/field judgment section 61 sumps up the first inter-pixel differences into a first inter-line difference. The frame/field judgment section 61 uses the first inter-line difference as an indication of the frame correlation. In addition, the frame/field judgment section 61 calculates the second inter-pixel differences between portions of the input 4:1:1 digital picture signal which represent two alternate lines. Then, the frame/field judgment section 61 sumps up the second inter-pixel differences into a second inter-line difference. The frame/field judgment section 61 uses the second inter-line difference as an indication of the field correlation. The frame/field judgment section 61 compares the first inter-line difference and the second inter-line difference to decide which of the frame correlation and the field correlation is greater.

Ninth Embodiment

Figure 22:
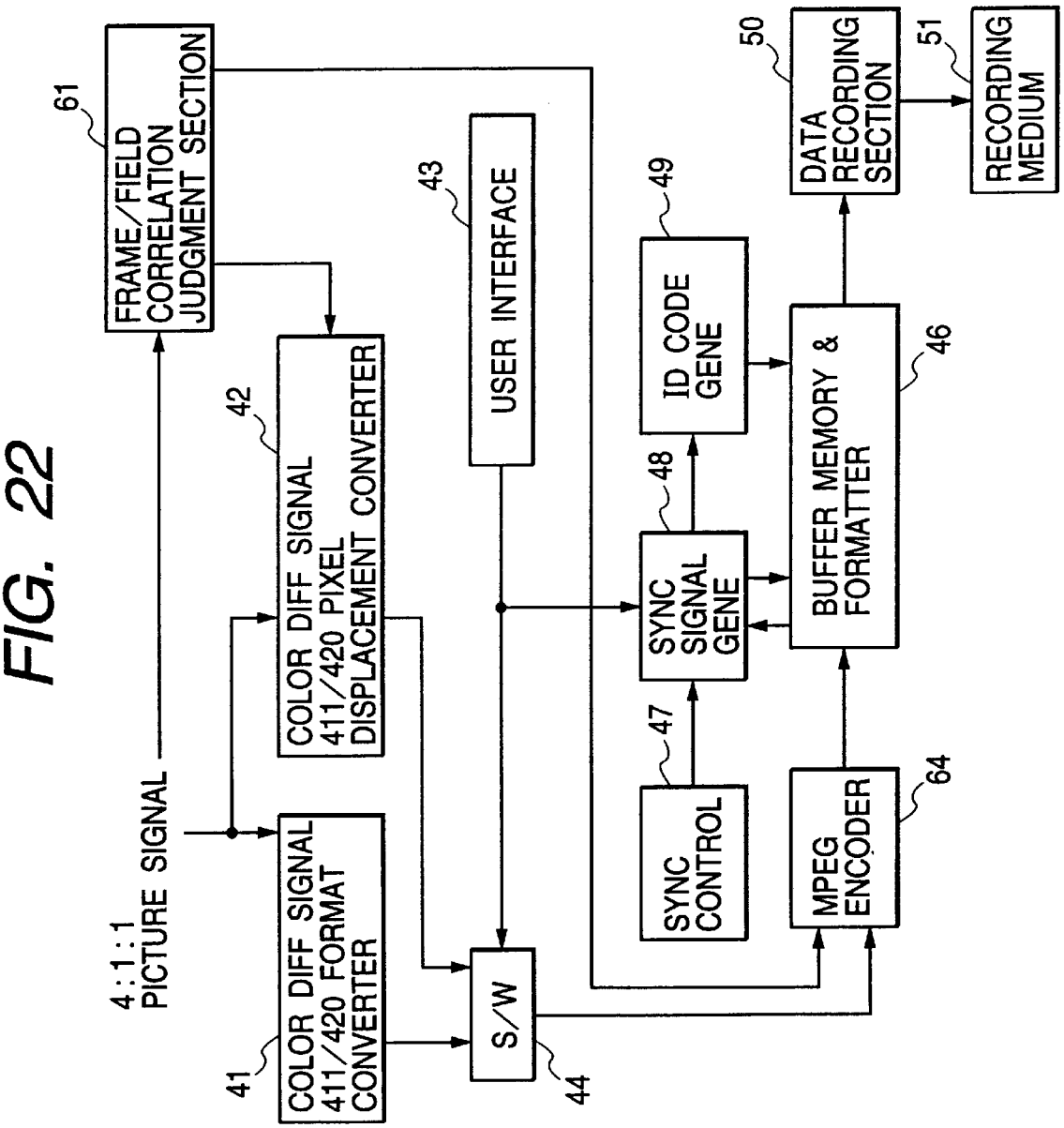
FIG. 22 is a block diagram of an encoding apparatus according to a ninth embodiment of this invention.

FIG. 22 shows an encoding apparatus according to a ninth embodiment of this invention. The encoding apparatus of FIG. 22 is similar to the encoding apparatus of FIG. 13 except for design changes mentioned hereinafter. The encoding apparatus of FIG. 21 includes a frame/field correlation judgment section 61. The encoding apparatus of FIG. 21 includes an MPEG encoder 64 instead of the MPEG encoder 45 (see FIG. 13). The frame/field judgment section 61 receives an input 4:1:1 digital picture signal. The frame/field judgment section 61 is connected to a 4:1:1/4:2:0 pixel displacement converter 42 and the MPEG encoder 64.

For every macro block (16 pixels by 16 lines) prescribed by the MPEG standards, the frame/field correlation judgment section 61 decides which of the frame correlation and the field correlation is greater. The frame/field correlation judgment section 61 informs the 4:1:1/4:2:0 pixel displacement converter 42 and the MPEG encoder 64 of the decision result.

For every macro block, the 4:1:1/4:2:0 pixel displacement converter 42 implements the displacement-method selection in accordance with the result of the decision by the frame/field correlation judgment section 61. In addition, the 4:1:1/4:2:0 pixel displacement converter 42 implements the conversion of the input 4:1:1 digital picture signal into a 4:2:0 digital picture signal according to the selected displacement method.

For every macro block, the MPEG encoder 64 multiplexes the decision-result information with the digital picture signal. It should be noted that since the decision-result information is equal in contents to DCT mode information, the decision-result information may not be multiplexed with the digital picture signal.

Tenth Embodiment

Figure 23:
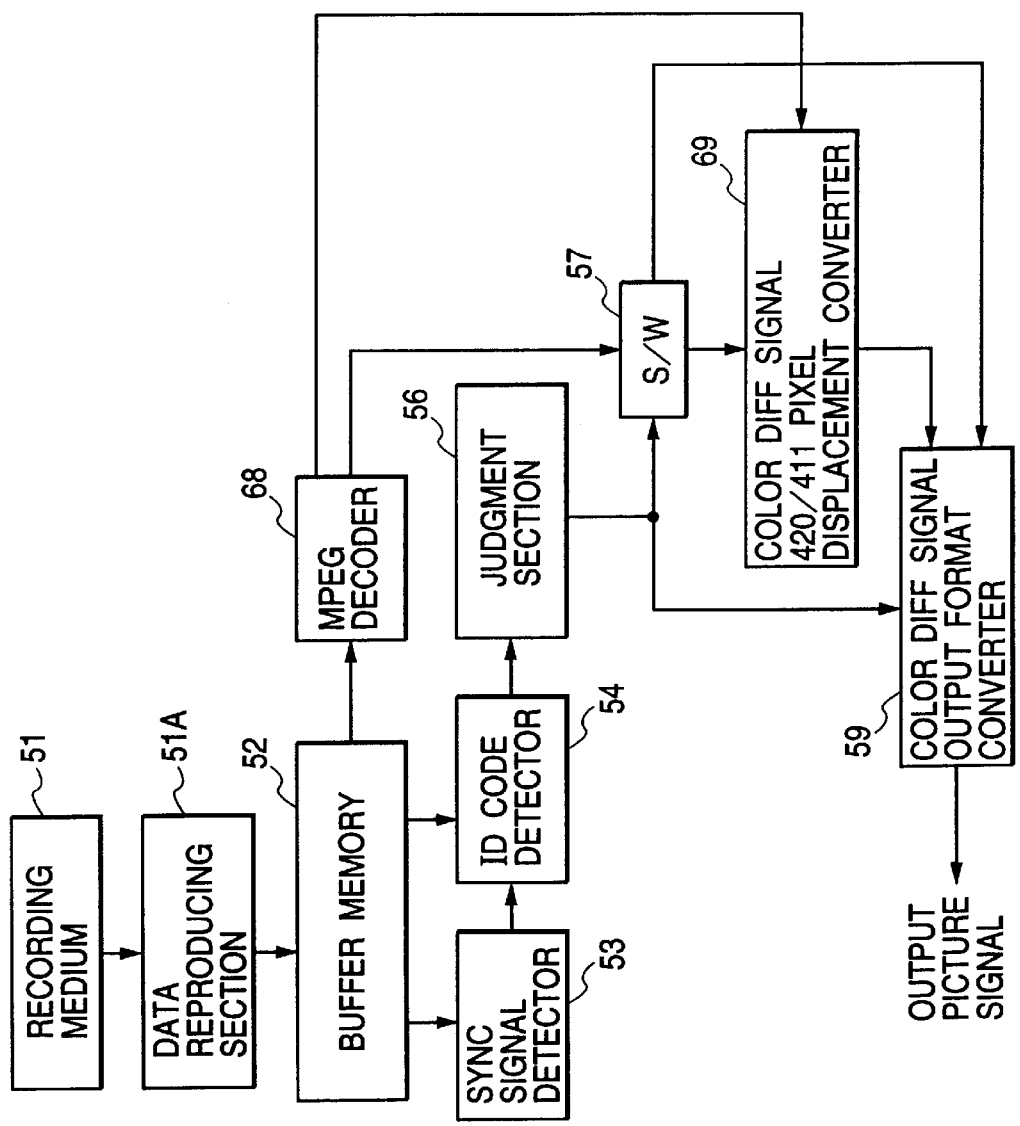
FIG. 23 is a block diagram of a decoding apparatus according to a tenth embodiment of this invention.

FIG. 23 shows a decoding apparatus according to a tenth embodiment of this invention. The decoding apparatus of FIG. 23 is similar to the decoding apparatus of FIG. 20 except for design changes mentioned hereinafter. The decoding apparatus of FIG. 23 corresponds to the encoding apparatus of FIG. 22. The decoding apparatus of FIG. 23 includes an MPEG decoder 68 and a 4:2:0/4:1:1 pixel displacement converter 69 instead of the MPEG decoder 55 and the 4:2:0/4:1:1 pixel displacement converter 58 (see FIG. 20) respectively.

The MPEG decoder 68 receives a reproduced digital picture signal from a buffer memory 52. The device 68 decodes the reproduced digital picture signal into a 4:2:0 digital picture signal. The MPEG decoder 68 outputs the 4:2:0 digital picture signal to a switch 57. In addition, the MPEG decoder 68 extracts a DCT mode signal from the reproduced digital picture signal. The MPEG decoder 68 feeds the DCT mode signal to the 4:2:0/4:1:1 pixel displacement converter 69.

The 4:2:0/4:1:1 pixel displacement converter 69 responds to the DCT mode signal as follows. In the case where the DCT mode signal represents that the present DCT mode is a field mode, the 4:2:0/4:1:1 pixel displacement converter 69 selects one of the displacement methods (the intra-field pixel displacement methods) in FIGS. 16 and 17. On the other hand, in the case where the DCT mode signal represents that the present DCT mode is a frame mode, the 4:2:0/4:1:1 pixel displacement converter 69 selects one of the displacement methods (the intra-frame pixel displacement methods) in FIGS. 18 and 19. The 4:2:0/4:1:1 pixel displacement converter 69 implements the conversion of the 4:2:0 digital picture signal into a 4:1:1 digital picture signal according to the selected displacement method.

Eleventh Embodiment

Figure 24:
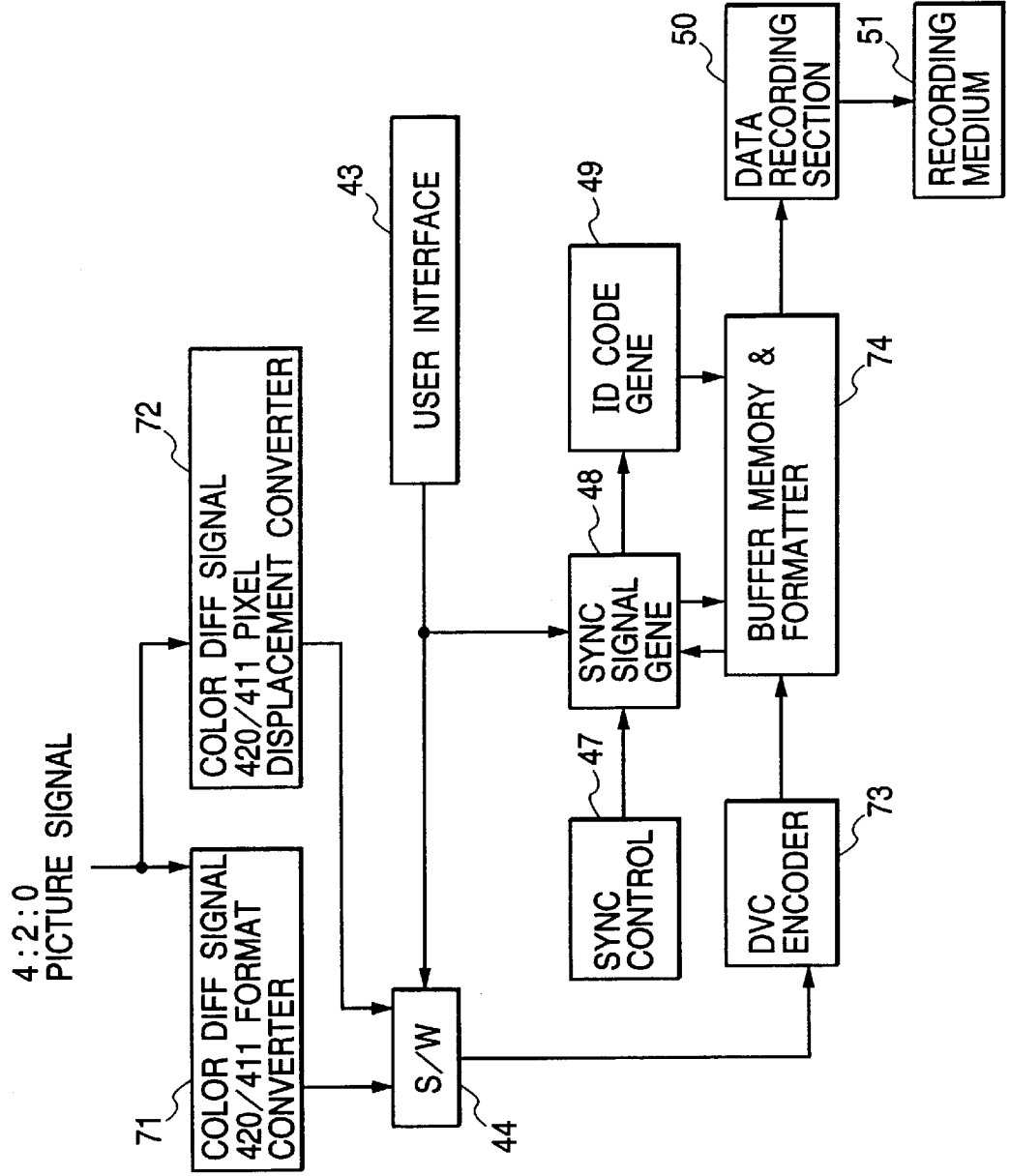
FIG. 24 is a block diagram of an encoding apparatus according to an eleventh embodiment of this invention.

FIG. 24 shows an encoding apparatus according to a ninth embodiment of this invention. The encoding apparatus of FIG. 24 is similar to the encoding apparatus of FIG. 13 except for design changes mentioned hereinafter. The encoding apparatus of FIG. 24 includes a 4:2:0/4:1:1 format converter 71 and a 4:2:0/4:1:1 pixel displacement converter 72 for color difference signals which replace the 4:1:1/4:2:0 format converter 41 and the 4:1:1/4:2:0 pixel displacement converter 42 (see FIG. 13) respectively. In addition, the encoding apparatus of FIG. 24 includes a DVC encoder 73 and a buffer memory and formatter 74 instead of the MPEG encoder 45 and the buffer memory and formatter 46 (see FIG. 13) respectively.

A 4:2:0 digital picture signal is inputted into the 4:2:0/4:1:1 format converter 71 and the 4:2:0/4:1:1 pixel displacement converter 72. The 4:2:0/4:1:1 format converter 71 halves the number of pixels (samples) of each digital color difference signal in the input 4:2:0 digital picture signal along a horizontal direction. The 4:2:0/4:1:1 format converter 71 over-samples each digital color difference signal in the input 4:1:1 digital picture signal along a vertical direction to double the number of pixels (signal samples) in the vertical direction. Accordingly, the 4:2:0/4:1:1 format converter 71 changes the input 4:2:0 digital picture signal into a 4:1:1 signal format. The 4:2:0/4:1:1 format converter 71 outputs the resultant 4:1:1 digital picture signal to a switch 44.

The 4:2:0/4:1:1 pixel displacement converter 72 subjects the input 4:2:0 digital picture signal to a color-signal pixel displacement process which corresponds to one of the previously-mentioned first to fourth displacement methods in FIGS. 16–19. Accordingly, the 4:2:0/4:1:1 pixel displacement converter 72 changes the input 4:2:0 digital picture signal into a 4:1:1 signal format. The 4:2:0/4:1:1 pixel displacement converter 72 outputs the resultant 4:1:1 digital picture signal to the switch 44.

The switch 44 selects one of the output signal from the 4:2:0/4:1:1 format converter 71 and the output signal from the 4:2:0/4:1:1 pixel displacement converter 72 in response to a switching signal outputted by a user interface 43. The switch 44 outputs the selected 4:1:1 digital picture signal to the DVC encoder 73.

The DVC encoder 73 subjects the 4:1:1 digital picture signal to a compressively encoding process which conforms to the DVC standards. Thereby, the DVC encoder 73 converts the 4:1:1 digital picture signal into a DVC-format digital picture signal. The DVC encoder 73 feeds the DVC-format digital picture signal to the buffer memory and formatter 74. The buffer memory and formatter 74 is basically similar in operation to the buffer memory and formatter 46 (see FIG. 13).

Twelfth Embodiment

Figure 25:
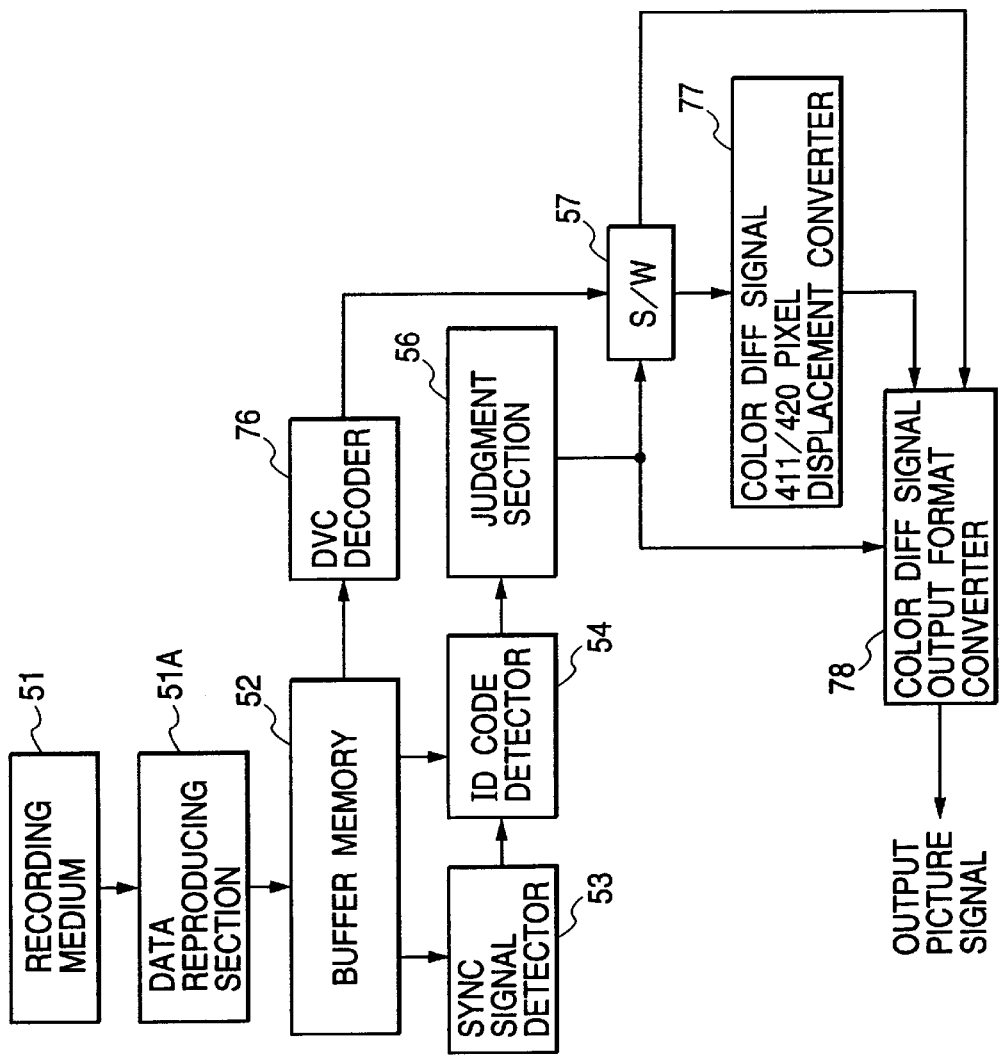
FIG. 25 is a block diagram of a decoding apparatus according to a twelfth embodiment of this invention.

FIG. 25 shows a decoding apparatus according to a twelfth embodiment of this invention. The decoding apparatus of FIG. 25 is similar to the decoding apparatus of FIG. 20 except for design changes mentioned hereinafter. The decoding apparatus of FIG. 25 corresponds to the encoding apparatus of FIG. 24. The decoding apparatus of FIG. 25 includes a DVC decoder 76 instead of the MPEG decoder 55 (see FIG. 20). In addition, the decoding apparatus of FIG. 25 includes a 4:1:1/4:2:0 pixel displacement converter 77 and a format converter 78 for color difference signals instead of the 4:2:0/4:1:1 pixel displacement converter 58 and the format converter 59 (see FIG. 20) respectively.

The DVC decoder 76 receives a reproduced digital picture signal from a buffer memory 52. The device 76 decodes the reproduced digital picture signal into a 4:1:1 digital picture signal. The DVC decoder 76 outputs the 4:1:1 digital picture signal to a switch 57.

The 4:1:1/4:2:0 pixel displacement converter 77 subjects the 4:1:1 digital picture signal, which is fed via the switch 57, to a color-signal pixel displacement process which corresponds to one of the previously-mentioned first to fourth displacement methods in FIGS. 9–12. The displacement method used by the 4:1:1/4:2:0 pixel displacement converter 77 corresponds to the displacement method used by the 4:2:0/4:1:1 pixel displacement converter 72 in the encoding apparatus (see FIG. 24). Accordingly, the 4:1:1/4:2:0 pixel displacement converter 77 changes the 4:1:1 digital picture signal into a 4:2:0 format. The 4:1:1/4:2:0 pixel displacement converter 77 outputs the resultant 4:2:0 digital picture signal to the format converter 78. The format converter 78 is basically similar in operation to the format converter 59 (see FIG. 20).

What is claimed is:

1. A method of converting a picture signal including a luminance signal and a color signal, wherein a first predetermined number of sample points of the luminance signal are located on every actual scanning line, and a second predetermined number of sample points of the color signal are located on every actual scanning line, and wherein the second predetermined number is equal to the first predetermined number multiplied by "1/n", where "n" denotes a predetermined integer equal to or greater than 2, the method comprising the steps of:

setting virtual scanning lines which correspond to respective pairs each having two successive actual scanning lines; and moving sample points of the color signal from each pair of two successive actual scanning lines to a corresponding virtual scanning line while rearranging the sample points on the corresponding virtual scanning line to convert the picture signal;

wherein a total number of sample points of the color signal per virtual scanning line is equal to the first predetermined number multiplied by "2/n", and a portion of the color signal whose sample points are located on a virtual scanning line corresponds to a portion of the luminance signal which relates to the corresponding pair of two successive actual scanning lines.

2. A method as recited in claim 1, wherein the moving and rearranging step comprises making nearest before-conversion sample points into neighboring after-conversion sample points on a virtual scanning line.

3. A method of converting a picture signal including a luminance signal and a color signal, wherein virtual scanning lines are set for respective pairs each having two successive actual scanning lines, wherein a first predetermined number of sample points of the luminance signal are located on every actual scanning line, and a second predetermined number of sample points of the color signal are located on every virtual scanning line, wherein the second predetermined number is equal to the first predetermined number multiplied by "2/n", where "n" denotes a predetermined integer equal to or greater than 2, the method comprising the steps of:

separating sample points of the color signal on every virtual scanning line into first and second groups assigned to respective two successive actual scanning lines in a corresponding pair respectively; and moving the sample points in the first group to first one of the two successive actual scanning lines while moving the sample points in the second group to second one of the two successive actual scanning lines to convert the picture signal;

wherein a total number of the sample points of the color signal per actual scanning line is equal to the first predetermined number multiplied by "1/n", and a portion of the color signal whose sample points are located on an actual scanning line corresponds to a portion of the luminance signal which relates to the same actual scanning line.

4. An apparatus for converting a picture signal including a luminance signal and a color signal, wherein a first predetermined number of sample points of the luminance signal are located on every actual scanning line, and a second predetermined number of sample points of the color signal are located on every actual scanning line, and wherein the second predetermined number is equal to the first predetermined number multiplied by "1/n", where "n" denotes a predetermined integer equal to or greater than 2, the apparatus comprising:

means for setting virtual scanning lines which correspond to respective pairs each having two successive actual scanning lines; and means for moving sample points of the color signal from each pair of two successive actual scanning lines to a corresponding virtual scanning line while rearranging the sample points on the corresponding virtual scanning line to convert the picture signal;

wherein a total number of sample points of the color signal per virtual scanning line is equal to the first predetermined number multiplied by "2/n", and a portion of the color signal whose sample points are located on a virtual scanning line corresponds to a portion of the luminance signal which relates to the corresponding pair of two successive actual scanning lines.

5. An apparatus as recited in claim 4, wherein the moving and rearranging means comprises means for making nearest before-conversion sample points into neighboring after-conversion sample points on a virtual scanning line.

6. An apparatus for converting a picture signal including a luminance signal and a color signal, wherein virtual scanning lines are set for respective pairs each having two successive actual scanning lines, wherein a first predetermined number of sample points of the luminance signal are located on every actual scanning line, and a second predetermined number of sample points of the color signal are located on every virtual scanning line, wherein the second predetermined number is equal to the first predetermined number multiplied by "2/n", where "n" denotes a predetermined integer equal to or greater than 2, the apparatus comprising:

means for separating sample points of the color signal on every virtual scanning line into first and second groups assigned to respective two successive actual scanning lines in a corresponding pair respectively; and means for moving the sample points in the first group to first one of the two successive actual scanning lines while moving the sample points in the second group to second one of the two successive actual scanning lines to convert the picture signal;

wherein a total number of the sample points of the color signal per actual scanning line is equal to the first predetermined number multiplied by "1/n", and a portion of the color signal whose sample points are located on an actual scanning line corresponds to a portion of the luminance signal which relates to the same actual scanning line.

7. A picture-signal recording and reproducing apparatus comprising:

first means for converting a first picture signal into a second picture signal, the first picture signal including a first luminance signal and a first color signal, wherein a first predetermined number of sample points of the first luminance signal are located on every actual scanning line, and a second predetermined number of sample points of the first color signal are located on every actual scanning line, and wherein the second predetermined number is equal to the first predetermined number multiplied by "1/n", where "n" denotes a predetermined integer equal to or greater than 2;

second means provided in the first means for setting virtual scanning lines which correspond to respective pairs each having two successive actual scanning lines;

third means provided in the first means for moving sample points of the first color signal from each pair of two successive actual scanning lines to a corresponding virtual scanning line while rearranging the sample points on the corresponding virtual scanning line to convert the first picture signal to the second picture signal;

wherein a total number of sample points of the first color signal per virtual scanning line is equal to the first predetermined number multiplied by "2/n", and a portion of the first color signal whose sample points are located on a virtual scanning line corresponds to a portion of the first luminance signal which relates to the corresponding pair of two successive actual scanning lines;

fourth means for compressing the second picture signal into a third picture signal;

fifth means for recording the third picture signal on a recording medium;

sixth means for reproducing a fourth picture signal from the recording medium;

seventh means for expanding the fourth picture signal into a fifth picture signal including a second luminance signal and a second color signal, wherein a third predetermined number of sample points of the second luminance signal are located on every actual scanning line, and a fourth predetermined number of sample points of the second color signal are located on every virtual scanning line, wherein the fourth predetermined number is equal to the third predetermined number multiplied by "2/n";

eighth means for converting the fifth picture signal into a sixth picture signal;

ninth means provided in the eighth means for separating sample points of the second color signal on every virtual scanning line into first and second groups assigned to respective two successive actual scanning lines in a corresponding pair respectively; and tenth means provided in the eighth means for moving the sample points in the first group to first one of the two successive actual scanning lines while moving the sample points in the second group to second one of the two successive actual scanning lines to convert the fifth picture signal into the sixth picture signal;

wherein a total number of the sample points of the second color signal per actual scanning line is equal to the third predetermined number multiplied by "1/n", and a portion of the second color signal whose sample points are located on an actual scanning line corresponds to a portion of the second luminance signal which relates to the same actual scanning line.

8. A method of encoding a picture signal, comprising the steps of:

displacing pixel positions of a color difference signal in an input picture signal of a first component format to pixel positions equivalent to pixel positions of a color difference signal in a picture signal of a second component format different from the first component format without changing contents of pixel-corresponding segments of the color difference signal in the input picture signal to convert the input picture signal into a conversion-resultant picture signal; and compressively encoding the conversion-resultant picture signal in accordance with an encoding process corresponding to the second component format.

9. A method as recited in claim 8, wherein the first component format is a 4:1:1 component format; the second component format is a 4:2:0 component format; and the compressively encoding conforms to an MPEG standard.

10. A method as recited in claim 8, wherein the first component format is a 4:2:0 component format; the second component format is a 4:1:1 component format; and the compressively encoding conforms to a DVC standard.

11. A method of decoding a picture signal generated by an encoding apparatus which comprises means for displacing pixel positions of a color difference signal in an input picture signal of a first component format to pixel positions equivalent to pixel positions of a color difference signal in a picture signal of a second component format different from the first component format, without changing contents of pixel-corresponding segments of the color difference signal in the input picture signal to convert the input picture signal into a conversion resultant picture signal; and means for compressively encoding the conversion-resultant picture signal into an encoding-resultant picture signal in accordance with an encoding process corresponding to the second component format, the method comprising the steps of:

expansively decoding the encoding-resultant picture signal into a decoding-resultant picture signal; and displacing pixel positions of a color difference signal in the decoding-resultant picture signal to pixel positions equivalent to pixel positions of a color difference signal in a picture signal of the first component format without changing contents of pixel-corresponding segments of the color difference signal in the decoding-resultant picture signal to convert the decoding-resultant picture signal.

12. An apparatus for encoding a picture signal, comprising:
   first means for displacing pixel positions of a color difference signal in an input picture signal of a first component format to pixel positions equivalent to pixel positions of a color difference signal in a picture signal of a second component format different from the first component format to convert the input picture signal into a conversion-resultant picture signal;
   second means for generating an ID code signal representing that the first means has executed the displacing;
   third means for compressively encoding the conversion-resultant picture signal into an encoding-resultant picture signal in accordance with an encoding process corresponding to the second component format; and
   fourth means for multiplexing the ID code signal with the encoding-resultant picture signal.

13. An apparatus for decoding a picture signal generated by an encoding apparatus which comprises means for displacing pixel positions of a color difference signal in an input picture signal of a first component format to pixel positions equivalent to pixel positions of a color difference signal in a picture signal of a second component format different from the first component format without changing contents of pixel-corresponding segments of the color difference signal in the input picture signal to convert the input picture signal into a conversion-resultant picture signal; and means for compressively encoding the conversion-resultant picture signal into an encoding-resultant picture signal in accordance with an encoding process corresponding to the second component format, the decoding apparatus comprising:
   means for expansively decoding the encoding-resultant picture signal into a decoding-resultant picture signal; and
   means for displacing pixel positions of a color difference signal in the decoding-resultant picture signal to pixel positions equivalent to pixel positions of a color difference signal in a picture signal of the first component format without changing contents of pixel-corresponding segments of the color difference signal in the decoding-resultant picture signal to convert the decoding-resultant picture signal.

* * * * *